US012656856B2

(12) United States Patent　　(10) Patent No.:　US 12,656,856 B2
Kim et al.　　(45) Date of Patent:　Jun. 16, 2026

(54) CONTINUOUS HAND POSE TRACKING WITH WRIST-WORN ANTENNA IMPEDANCE CHARACTERISTIC SENSING

(71) Applicants:Apple Inc., Cupertino, CA (US); Carnegie Mellon University, Pittsburgh, PA (US)

(72) Inventors: Daehwa Kim, Yeongcheon (KR); Istvan J. Szini, San Jose, CA (US); Christopher Harrison, Pittsburgh, PA (US)

(73) Assignees: Apple Inc., Cupertino, CA (US); Carnegie Mellon University, Pittsburgh, PA (US)

( * ) Notice:　Subject to any disclaimer, the term of this patent is extended or adjusted under 35 U.S.C. 154(b) by 528 days.

(21) Appl. No.: 17/952,138

(22) Filed:　Sep. 23, 2022

(65)　Prior Publication Data

US 2024/0103605 A1　　Mar. 28, 2024

(51) Int. Cl.
　　*G06F 3/01*　　(2006.01)
　　*H01Q 1/27*　　(2006.01)
　　(Continued)
(52) U.S. Cl.
　　CPC .............. *G06F 3/011* (2013.01); *G06F 3/017* (2013.01); *H01Q 1/273* (2013.01); *H01Q 9/16* (2013.01); *H01Q 21/26* (2013.01); *H01Q 25/00* (2013.01)
(58) Field of Classification Search
　　None
　　See application file for complete search history.

(56)　　References Cited

U.S. PATENT DOCUMENTS

|  |  |  |
|---|---|---|
| 11,886,559 B2 | 1/2024 | Lock |
| 2017/0075426 A1 | 3/2017 | Camacho Perez et al. |

(Continued)

OTHER PUBLICATIONS

3ds.com [online], "CST Studio Suite," available on or before Dec. 9, 2022, via Internet Archive: Wayback Machine URL <https://web.archive.org/web/20221209091920/https://www.3ds.com/products-services/simulia/products/cst-studio-suite/>, retrieved on Nov. 14, 2023, URL <https://www.3ds.com/products-services/simulia/products/cst-studio-suite/>, 4 pages.

(Continued)

*Primary Examiner* — Farhana A Hoque
(74) *Attorney, Agent, or Firm* — Fish & Richardson P.C.

(57)　　ABSTRACT

Embodiments are disclosed for a continuous hand pose tracking system employing at least one wrist-worn antenna, from which real-time dielectric loading resulting from different hand poses). The sensor data is interpreted by a machine learning backend, which outputs a fully-posed three-dimensional (3D) hand that can be continuously tracked. In some embodiments, two degrees of freedom (2DOF) wrist angle and micro-gestures are tracked. The hand pose tracking system can be extended to include two or more and/or different types of antennas operating at different self-resonances. In an embodiment, a method comprises: determining, with at least one processor of a wrist-worn device, a complex impedance characteristic variation based on a dynamic finite electric ground plane of at least one antenna coupled to the device; and predicting, with the at least one processor, a hand pose of a user wearing the device on a their wrist based on the determined complex impedance characteristic variation.

20 Claims, 31 Drawing Sheets

(51) Int. Cl.
  *H01Q 9/16*     (2006.01)
  *H01Q 21/26*    (2006.01)
  *H01Q 25/00*    (2006.01)

(56)              References Cited

U.S. PATENT DOCUMENTS

2017/0123487  A1      5/2017  Hazra et al.
2017/0360323  A1     12/2017  Li et al.
2019/0379122  A1*    12/2019  Kenkel .................. H01Q 1/273
2020/0363259  A1*    11/2020  Bergstra ................ G01G 23/36

OTHER PUBLICATIONS

Ahmed et al., "Hand gestures recognition using radar sensors for human-computer-interaction: A review," Remote Sensing, Feb. 2, 2021, 13(3):527, 24 pages.
Arakawa et al., "Hand with Sensing Sphere: Body-Centered Spatial Interactions with a Hand-Worn Spherical Camera," Proceedings of the 2020 ACM Symposium on Spatial User Interaction, Oct. 31, 2020, pp. 1-10.
Arefin et al., "Wireless body area network: An overview and various applications," Journal of Computer and Communications, May 9, 2017, 5(7):53-64.
Baert.com [online], "Pagoda Antenna," available on or before Nov. 11, 2023, via Internet Archive: Wayback Machine URL <https://web.archive.org/web/20231111132022/https://www.maartenbaert.be/quadcopters/antennas/pagoda-antenna/>, retrieved on Jan. 22, 2024, URL<https://www.maartenbaert.be/quadcopters/antennas/pagoda-antenna/>, 6 pages.
Chan, "Cyclopsring: Enabling whole-hand and context-aware interactions through a fisheye ring," Proceedings of the 28th Annual ACM Symposium on User Interface Software & Technology, Nov. 5, 2015, pp. 549-556.
Chung et al., "A 0.01-26 GHz single-chip SiGe reflectometer for two-port vector network analyzers," 2017 IEEE MTT-S International Microwave Symposium (IMS), Jun. 4, 2017, pp. 1259-1261.
Chung et al., "A Packaged 0.01-26-GHz single-chip SiGe reflectometer for two-port vector network analyzers," IEEE Transactions on Microwave Theory and Techniques, Jan. 23, 2020, 68(5):1794-1808.
Cohn et al., "An ultra-low-power human body motion sensor using static electric field sensing," Proceedings of the 2012 ACM conference on ubiquitous computing, Sep. 5, 2012, pp. 99-102.
DeFanti et al., "Final Report to the National Endowment of the Arts," US NEAR60-34-163 Final Project Report, Nov. 1977, 30 pages.
Dementyev et al., "WristFlex: low-power gesture input with wrist-worn pressure sensors," Proceedings of the 27th annual ACM symposium on User interface software and technology, Oct. 5, 2014, pp. 161-166.
Fukui et al., "Hand shape classification with a wrist contour sensor: development of a prototype device," Proceedings of the 13th International Conference on Ubiquitous computing, Sep. 17, 2011, pp. 311-314.
Gong et al., "Pyro: Thumb-tip gesture recognition using pyroelectric infrared sensing," Proceedings of the 30th Annual ACM Symposium on User Interface Software and Technology, Oct. 20, 2017, p. 553-563.
Gong et al., "Wristwhirl: One-handed continuous smartwatch input using wrist gestures," Proceedings of the 29th Annual Symposium on User Interface Software and Technology, Oct. 16, 2016, pp. 861-872.
Han et al., "MEgATrack: monochrome egocentric articulated hand-tracking for virtual reality," ACM Transactions on Graphics, Jul. 8, 2020, 39(4):87:1-13.
Harrison et al., "Skinput: appropriating the body as an input surface," Proceedings of the SIGCHI conference on human factors in computing systems, Apr. 10, 2010, pp. 453-462.

Hu et al., "FingerTrak: Continuous 3D hand pose tracking by deep learning hand silhouettes captured by miniature thermal cameras on wrist," Proceedings of the ACM on Interactive, Mobile, Wearable and Ubiquitous Technologies, Jun. 15, 2020, 4(2):1-24.
Iravantchi et al., "BeamBand: Hand gesture sensing with ultrasonic beamforming," Proceedings of the 2019 CHI Conference on Human Factors in Computing Systems, May 2, 2019, 1-10.
Iravantchi et al., "Interferi: Gesture sensing using on-body acoustic interferometry," Proceedings of the 2019 CHI Conference on Human Factors in Computing Systems, May 2, 2019, pp. 1-13.
Jin et al., "Towards wearable everyday body-frame tracking using passive RFIDs," Proceedings of the ACM on Interactive, Mobile, Wearable and Ubiquitous Technologies, Jan. 8, 2018, 9(4):1-23.
Jung et al., "A wearable gesture recognition device for detecting muscular activities based on air-pressure sensors," IEEE Transactions on Industrial Informatics, Feb. 19, 2015, 11(2):485-494.
Kienzle et al., "ElectroRing: Subtle pinch and touch detection with a ring," Proceedings of the 2021 CHI Conference on Human Factors in Computing Systems, May 6, 2021, pp. 1-12.
Kim et al., "Atatouch: Robust finger pinch detection for a vr controller using rf return loss," Proceedings of the 2021 CHI Conference on Human Factors in Computing Systems, May 6, 2021, pp. 1-9.
Kim et al., "Digits: freehand 3D interactions anywhere using a wrist-worn gloveless sensor," Proceedings of the 25th annual ACM symposium on User interface software and technology, Oct. 7, 2012, pp. 167-176.
Laput et al., "Sensing fine-grained hand activity with smartwatches," Proceedings of the 2019 CHI Conference on Human Factors in Computing Systems, May 2, 2019, pp. 1-13.
Laput et al., "ViBand: High-fidelity bio-acoustic sensing using commodity smartwatch accelerometers," Proceedings of the 29th Annual Symposium on User Interface Software and Technology, Oct. 16, 2016, pp. 321-333.
Lee et al., "SpaceTop: integrating 2D and spatial 3D interactions in a see-through desktop environment," Proceedings of the SIGCHI Conference on Human Factors in Computing Systems, Apr. 27, 2013, pp. 189-192.
Li et al., "Classification of human activities using variation in impedance of single on-body antenna," IEEE Antennas and Wireless Propagation Letters, Jul. 7, 2016, 16:541-544.
Li et al., "Pixel-level hand detection in ego-centric videos," Proceedings of the IEEE conference on computer vision and pattern recognition, Jun. 2013, pp. 3570-3577.
Lien et al., "Soli: Ubiquitous gesture sensing with millimeter wave radar," ACM Transactions on Graphics (TOG), Jul. 11, 2016, 35(4):1-19.
Liu et al., "NeuroPose: 3D hand pose tracking using EMG wearables," Proceedings of the Web Conference, Apr. 19, 2021, pp. 1471-1482.
Liu et al., "WR-Hand: Wearable armband can track user's hand," Proceedings of the ACM on Interactive, Mobile, Wearable and Ubiquitous Technologies, Sep. 14, 2021, 5(3):1-27.
Lugaresi et al., "MediaPipe: A framework for building perception pipelines," CoRR, submitted on Jun. 14, 2019, arXiv:1906.08172, 9 pages.
Mirhadi et al., "Analysis of finite ground plane effects on antenna performance using discrete Green's function," 2012 15 International Symposium on Antenna Technology and Applied Electromagnetics, Jun. 25, 2012, pp. 1-3.
myo.com [online], "Myo EMG armband," available on or before Jan. 20, 2022, via Internet Archive: Wayback Machine URL <https://web.archive.org/web/20220120210835/https://developerblog.myo.com/>, retrieved on Nov. 15, 2023, URL<https://developerblog.myo.com/>, 23 pages.
NanoRFE.com [online], "NanoVNA V2 official Site," available on or before Oct. 7, 2023, via Internet Archive: Wayback Machine URL <https://web.archive.org/web/20231007234743/https://nanorfe.com/nanovna-v2.html>, retrieved on Jan. 22, 2024, URL<https://nanorfe.com/nanovna-v2.html>, 9 pages.
noitom.com [online], "Hi5 VR Glove," available on or before Sep. 30, 2023, via Internet Archive: Wayback Machine URL <https://

(56)　　　　　　References Cited

OTHER PUBLICATIONS web.archive.org/web/20230930160828/https://www.noitom.com/hi5-vr-glove>, retrieved on Jan. 22, 2024, URL<https://www.noitom.com/hi5-vr-glove>, 5 pages.

Paradiso et al [online]., "Gesture-Sensing Radars Project," available on or before Nov. 3, 2022, via Internet Archive: Wayback Machine URL <https://web.archive.org/web/20221103092351/https://resenv.media.mit.edu/Radar/index.html>, retrieved on Jan. 22, 2023, URL<https://resenv.media.mit.edu/Radar/index.html>, 3 pages.

Paradiso et al., "The magic carpet: physical sensing for immersive environments," CHI'97 Extended Abstracts on Human Factors in Computing Systems, Mar. 22, 1997, 277-278.

Parizi et al., "Rotowrist: Continuous infrared wrist angle tracking using a wristband," Proceedings of the 27th ACM Symposium on Virtual Reality Software and Technology, Dec. 8, 2021, 1-11.

Pigou et al., "Sign language recognition using convolutional neural networks," 13th European Conference on Computer Vision, Jan. 2015, pp. 572-578.

Romero et al., "Embodied Hands: Modeling and Capturing Hands and Bodies Together," ACM Transactions on Graphics, Nov. 2017, 36(6): 1-19.

Sato et al., "Touché: enhancing touch interaction on humans, screens, liquids, and everyday objects," Proceedings of the SIGCHI Conference on Human Factors in Computing Systems, May 5, 2012, pp. 483-492.

Sluyters et al., "Hand gesture recognition for an off-the-shelf radar by electromagnetic modeling and inversion," 27th International Conference on Intelligent User Interfaces, Mar. 22, 2022, 506-522.

Smith et al., "Electric field sensing for graphical interfaces," IEEE Computer Graphics and Applications, May 1998, 18(3):1-17.

Smith, "Electric Field Imaging," Thesis for the degree of Doctor of Philosophy, Massachusetts Institute of Technology, Feb. 1999, 216 pages.

speag.swiss [online], "SPEAG," available on or before Dec. 16, 2023, via Internet Archive: Wayback Machine URL <https://web.archive.org/web/20231216181646/https://speag.swiss/>, retrieved on Jan. 22, 2024, URL <https://speag.swiss/>, 1 page.

Sridhar et al., "Watchsense: On-and above-skin input sensing through a wearable depth sensor," Proceedings of the 2017 CHI Conference on Human Factors in Computing Systems, May 2, 2017, pp. 3891-3902.

Sturman et al., "A survey of glove-based input," IEEE Computer graphics and Applications, Jan. 1994, 14(1):30-39.

Sun et al., "ThumbTrak: Recognizing micro-finger poses using a ring with proximity sensing," Proceedings of the 23rd International Conference on Mobile Human-Computer Interaction, Sep. 27, 2021, 16 pages.

Tayli et al., "Physical bounds for antennas above a ground plane," IEEE Antennas and Wireless Propagation Letters, Dec. 2015, 15:1281-1284.

Truong et al., "Capband: Battery-free successive capacitance sensing wristband for hand gesture recognition," Proceedings of the 16th ACM Conference on Embedded Networked Sensor Systems, Nov. 4, 2018, pp. 54-67.

Vicon.com [online], "Vicon," available on or before Dec. 22, 2023, via Internet Archive: Wayback Machine URL <https://web.archive.org/web/20231222193809/https://www.vicon.com/>, retrieved on Jan. 22, 2024, URL<https://www.vicon.com/>, 1 page.

Visual Analysis of Humans: Looking at People, Springer, 2011th edition, Oct. 2011, Part IV, pp. 539-562.

Wen et al., "Serendipity: Finger gesture recognition using an off-the-shelf smartwatch," Proceedings of the 2016 CHI conference on human factors in computing systems, May 7, 2016, pp. 3847-3851.

Wilhelm et al., "eRing: multiple finger gesture recognition with one ring using an electric field," Proceedings of the 2nd International Workshop on Sensor-based Activity Recognition and Interaction, Jun. 25, 2015, pp. 1-6.

Wilhelm et al., "PeriSense: Ring-based multi-finger gesture interaction utilizing capacitive proximity sensing," Sensors, Jul. 17, 2020, 20(14):3990, 23 pages.

Wu et al., "Back-hand-pose: 3d hand pose estimation for a wrist-worn camera via dorsum deformation network," Proceedings of the 33rd Annual ACM Symposium on User Interface Software and Technology, Oct. 20, 2020, pp. 1147-1160.

Xu et al., "Classification of finger movements based on reflection coefficient variations of a body-worn electrically small antenna," IEEE Antennas and Wireless Propagation Letters, Mar. 10, 2017, 16:1812-1815.

Xue et al., "On-body radiation of 3D-printed fold cylindrical helix (FCH) wearable antenna," 2017 Texas Symposium on Wireless and Microwave Circuits and Systems, Mar. 30, 2017, pp. 1-4.

Yamato et al., "Hand gesture interaction with a low-resolution infrared image sensor on an inner wrist," Proceedings of the International Conference on Advanced Visual Interfaces, Sep. 28, 2020, pp. 1-5.

Yeo et al., "Opisthenar: Hand poses and finger tapping recognition by observing back of hand using embedded wrist camera," Proceedings of the 32nd Annual ACM Symposium on User Interface Software and Technology, Oct. 17, 2019, pp. 963-971.

Yu et al., "A frame detection method for real-time hand gesture recognition systems using CW-radar," Sensors, Apr. 18, 2020, 20(2321):1-17.

Zhang et al., "ActiTouch: Robust touch detection for on-skin AR/VR interfaces," Proceedings of the 32nd Annual ACM Symposium on User Interface Software and Technology, Oct. 17, 2019, pp. 1151-1159.

Zhang et al., "Advancing hand gesture recognition with high resolution electrical impedance tomography," Proceedings of the 29th Annual Symposium on User Interface Software and Technology, Oct. 16, 2016, pp. 843-850.

Zhang et al., "Skintrack: Using the body as an electrical waveguide for continuous finger tracking on the skin," Proceedings of the 2016 CHI Conference on Human Factors in Computing Systems, May 7, 2016, pp. 1491-1503.

Zhang et al., "Tomo: Wearable, low-cost electrical impedance tomography for hand gesture recognition," Proceedings of the 28th Annual ACM Symposium on User Interface Software & Technology, Nov. 5, 2015, pp. 167-173.

Zhao et al., "Through-wall human pose estimation using radio signals," Proceedings of the IEEE conference on computer vision and pattern recognition, Dec. 2018, pp. 7356-7365.

Zhou et al., "AuraSense: enabling expressive around-smartwatch interactions with electric field sensing," Proceedings of the 29th Annual Symposium on User Interface Software and Technology, Oct. 16, 2016, pp. 81-86.

* cited by examiner

ANTENNA
TOPOLOGY

FOLDED
CYLINDRICAL HELIX

REAL WORLD
MEASUREMENT

SIMULATION
RESULT (NOT SIMULATED)

MEAN ERROR 0.57 cm (SD = 0.66)

CLASSIFICATION
ACCURACY

100%

ANTENNA LOCATION

RIGHT

REAL WORLD MEASUREMENT

MAGNITUDE (dB)

PHASE (°)

SIMULATION RESULT

MAGNITUDE (dB)

PHASE (°)

FIST
NEUTRAL
INDEX_PINCH

CONFUSION MATRIX

| 100% | 0% | 0% | FIST |
| 0% | 100% | 0% | PINCH |
| 0% | 0% | 100% | NEUTRAL |

MEAN ERROR 0.59 cm (SD = 0.72)

FRONT ANTENNA ON
BACK-RIGHT ANTENNA OFF

REFERENCE PHOTO

S11 PARAMETER

EtherPose OUTPUT

LITTLE PINCH

RING PINCH

MIDDLE PINCH

INDEX PINCH

REFERENCE PHOTO

S11 PARAMETER

EtherPose OUTPUT

NEUTRAL

SPIDERMAN

STRETCH

CONTINUOUS HAND POSE TRACKING WITH WRIST-WORN ANTENNA IMPEDANCE CHARACTERISTIC SENSING

TECHNICAL FIELD

This disclosure relates generally to hand pose tracking.

BACKGROUND

Applications that use hand pose tracking are numerous, including virtual and augmented reality, spatial user interfaces, sign language recognition and context awareness. Existing wrist-worn hand pose systems use optical methods (e.g., RGB cameras, thermal cameras, range finders). These methods, however, are sensitive to occlusion from clothing and the user's hand itself in certain poses. Wrist-worn camera-based methods also innately carry privacy implications that can deter consumers.

SUMMARY

Embodiments are disclosed for a continuous hand pose tracking system employing at least one wrist-worn antenna, from which real-time antenna complex impedance characteristics are used to predict different hand poses. The sensor data is interpreted by a machine learning backend, which outputs a fully-posed three-dimensional (3D) hand that can be continuously tracked by the system even when the hand is covered in fabric. In some embodiments, two degrees of freedom (DOF) wrist angle and micro-gestures are tracked. The hand pose tracking system can be extended to include two or more and/or different types of antennas operating at different self-resonant frequencies.

In an embodiment, a method comprises: determining, with at least one processor of a wrist-worn device, an impedance characteristic variation based on a dynamic finite electric ground plane of at least one antenna coupled to the device; and predicting, with the at least one processor, a hand pose of a user wearing the device on a their wrist based on the determined impedance characteristic variation.

In an embodiment, determining the impedance characteristic variation comprises: measuring return loss magnitude and complex impedance magnitude and phase shift for the at least one antenna as a function of frequency; and determining the impedance characteristic variation from the measured return loss magnitude and complex impedance magnitude and phase shift.

In an embodiment, the predicting is implemented using a machine learning model.

In an embodiment, the method further comprises: measuring return loss magnitude and complex impedance magnitude and phase shift for the at least one antenna as a function of frequency, and determining the impedance characteristic variation from the measured return loss magnitude and complex impedance magnitude and phase shift; computing a first derivative of the return loss magnitude and complex impedance magnitude and phase shift; determining an index of a lower value of return loss magnitude; computing a mean of the return loss magnitudes and phase shifts; computing a minimum and maximum of the return loss magnitudes and phase shifts; computing a standard deviation of the return loss magnitudes and phase shifts; and aggregating the first derivative, index of lower value of return loss magnitude, minimum, maximum and standard deviation into an input feature vector; and providing the input feature vector to the machine learning model.

In an embodiment, a hand input modality for training the machine learning model include images of hand poses.

In an embodiment, a hand input modality for training the machine learning model include images of wrist angles.

In an embodiment, a hand input modality for training the machine learning model include images of discrete hand locations.

In an embodiment, an apparatus comprises: at least one antenna; at least one processor coupled to the at least one antenna, the processor configured to perform operations comprising: determining a complex impedance characteristic variation based on a dynamic finite electric ground plane of at least one antenna coupled to the device; and predicting a hand pose of a user wearing the device on a their wrist based on the determined impedance characteristic variation based on the variation of the finite coupled ground plane created by the user hand gesture and dimension.

In an embodiment, the apparatus includes at least two antennas with different topologies.

In an embodiment, the apparatus includes at least two antennas with different resonant frequencies.

In an embodiment, the apparatus includes at least two antennas with different polarization.

In an embodiment, the apparatus includes at least two antennas with different antenna radiation patterns.

In an embodiment, the apparatus includes at least two antennas with different quality factors.

In an embodiment, the apparatus includes a distributed antenna array of two or more antennas.

In an embodiment, the apparatus includes at least two antennas that are coupled to the device such that they radiate in opposite directions.

In an embodiment, the at least one antenna is a cloverleaf antenna.

In an embodiment, the at least one antenna is a planar antenna

In an embodiment, the at least one antenna is a linear antenna

In an embodiment, the at least one antenna is a loop antenna

In an embodiment, the at least one antenna is an electric small antenna

In an embodiment, the apparatus is a smartwatch.

In an embodiment, the apparatus further comprises an attachment mechanism for attaching the apparatus to a wrist.

In an embodiment, a non-transitory, computer-readable storage medium storing instructions that when executed by the at least one processor, cause the at least one processor to preform operations comprising: determining an complex impedance characteristic variation based on a dynamic finite electric ground plane of at least one antenna coupled to a wrist-worn device; and predicting a hand pose of a user wearing the device based on the determined complex impedance characteristic variation.

In an embodiment, determining the impedance characteristic variation comprises: measuring return loss magnitude and complex impedance magnitude and phase shift for the at least one antenna as a function of frequency; and determining the complex impedance characteristic variation from the measured return loss magnitude and complex impedance magnitude and phase shift.

Other embodiments can include an apparatus, computing device and non-transitory, computer-readable storage medium.

Particular embodiments described herein provide one or more of the following advantages. The disclosed embodiments provide an alternative to optical hand pose tracking methods that are not sensitive to occlusion from clothing or the user's hand, and do not have the privacy concerns of optical methods.

The details of one or more implementations of the subject matter are set forth in the accompanying drawings and the description below. Other features, aspects and advantages of the subject matter will become apparent from the description, the drawings and the claims.

DETAILED DESCRIPTION

Sensing Principle

The disclosed embodiments leverage "loading mode" electric field sensing, in which a radiating element is sufficiently proximate to a human-body that the radiating element and human-body capacitively couple. The proximity of the radiating element to human tissue means the user becomes part of the radiated element ground plane. With a high frequency of operation and corresponding small wavelength, the coupled human tissue (e.g., wrist and hand) becomes less than a virtual infinite ground plane. At the frequency of operation, variation in hand pose changes the antenna finite ground plane, and any change in the hand pose manifests as a change in the antenna resultant wavelength, and thus the antenna's self-resonance frequency. The discrimination of hand poses is defined by the antenna complex impedance change at a predetermined frequency due to a self-resonance shift caused by alterations in the coupled virtual ground due to the hand pose. Depending on the antenna topology, this coupling effect can be varied and enhanced.

Example Wrist-Worn Hand Pose Tracking Device

Figure 1A:
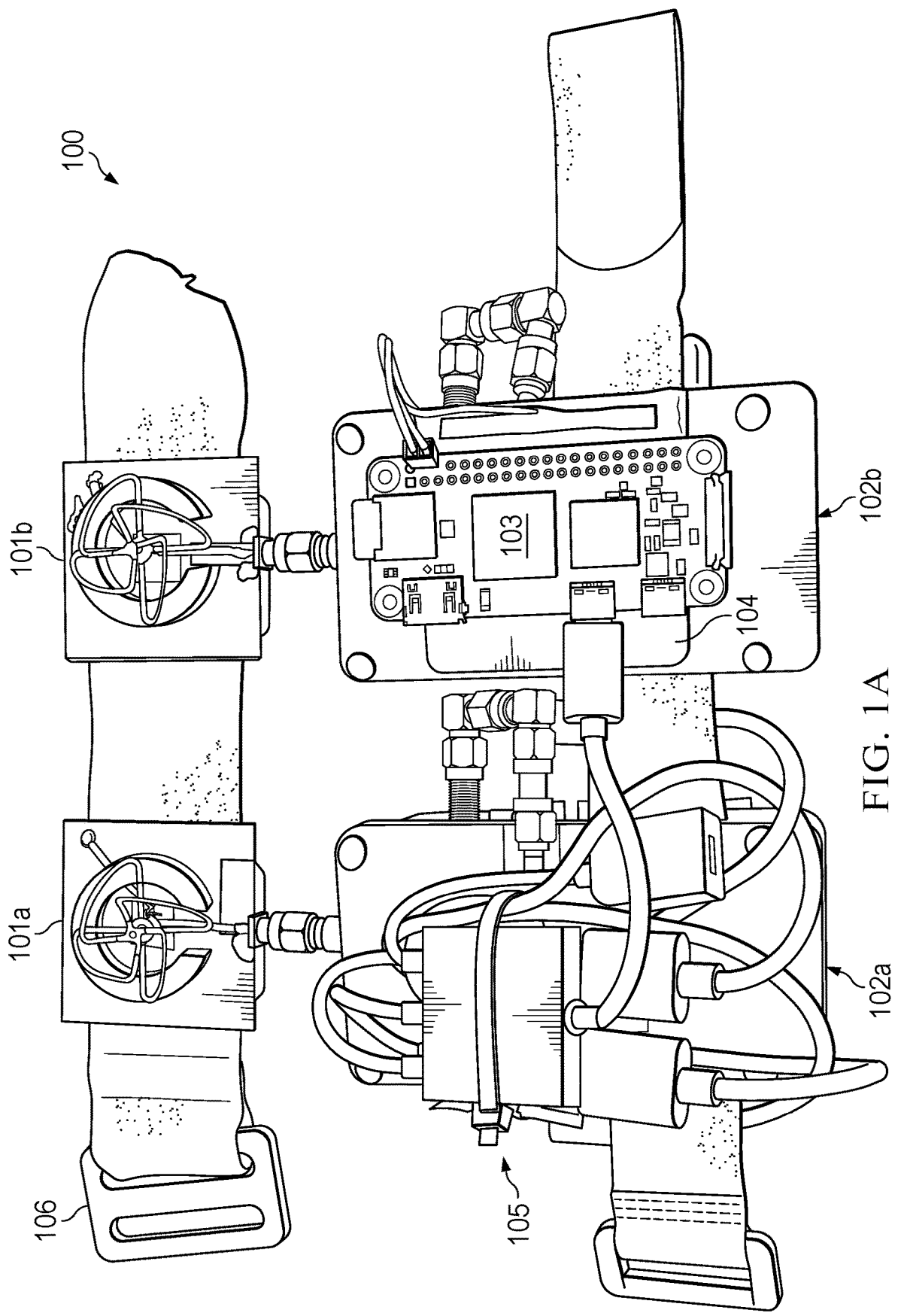
FIG. 1A is an example wrist-worn hand pose tracking device for continuous hand pose tracking with antenna impedance characteristic sensing, according to an embodiment.

FIG. 1A is an example wrist-worn hand pose tracking device 100 for continuous hand pose tracking with antenna impedance characteristic sensing, according to an embodiment. Device 100 includes antennas 101a, 101b, vector network analyzers (VNAs) 102a, 102b, processor 103, power source 104 (e.g., a battery), communication port 105 (e.g., a USB port) and attachment device 106 (e.g., an elastic band, Velcro, etc.). The above components can be attached or coupled to a support structure (e.g., thick acrylic, printed circuit board, etc.), which is coupled to attachment device 106. Device 100 can be integrated into a housing for protection from the environment, electromagnetic (EM) shielding and/or aesthetics.

Note that device 100 is proof-of-concept hardware and therefore not optimized for size or aesthetics. In a commercial embodiment, a radio frequency (RF) multiplexer could allow for a single VNA to utilize two or more antennas, rather than having duplicate VNAs. In other embodiments, a single VNA could utilize two or more antennas to measure S11 and S22 parameters, which could be used to improve hand pose prediction. In some embodiments, to reduce size a single-chip VNA can be used, such as described in Chung, Hyunchul, Qian Ma, Mustafa Sayginer and Gabriel M. Rebeiz. "A Packaged 0.01-26-GHz Single-Chip SiGe Reflectometer for Two-Port Vector Network Analyzers." IEEE Transactions on Microwave Theory and Techniques 68 (2020): 1794-1808.

In the embodiment shown, antennas 101a, 101b are cloverleaf antennas with ground planes located at the front and left-back positions on the wrist, as described in reference to FIGS. 4 and 5. The design and dimensions of cloverleaf antennas 101a, 101b are shown in column three of FIG. 3. Antennas 101a, 101b are mounted to a support structure (e.g., thick acrylic) with features (e.g., cutouts) that allow elastic band 106 to loop through, permitting flexible antenna placement for a variety of wrist diameters. While it is desirable that antennas 101a, 101b have identical characteristics, in practice there will likely be small construction differences. In this example embodiment, the resonant frequencies of the front and left-back antennas 101a, 101b on the wrist are about 1.33 and about 1.39 GHz, respectively, while the magnitude of the S11 parameters at the resonant frequencies are about −30 and about −42 dB, respectively.

In the example shown, each antenna 101a, 101b is attached to its own dedicated VNA 102a, 102b (e.g., attached with a rigid SMA connector). Both VNAs 102a, 102b connect to a single processor 103 (e.g., a Raspberry Pi Zero 2). Processor 103 runs software that implements a machine learning model that is trained to predict hand poses. In an embodiment, VNAs 102a, 102b measure the S11 parameter (reflection coefficient/return loss). The S11 parameter, which is described in further detail below, describes the ratio between the returned RF signal and the incident RF signal reflected by an impedance discontinuity in the medium.

Example Processing Pipeline

Figure 1B:
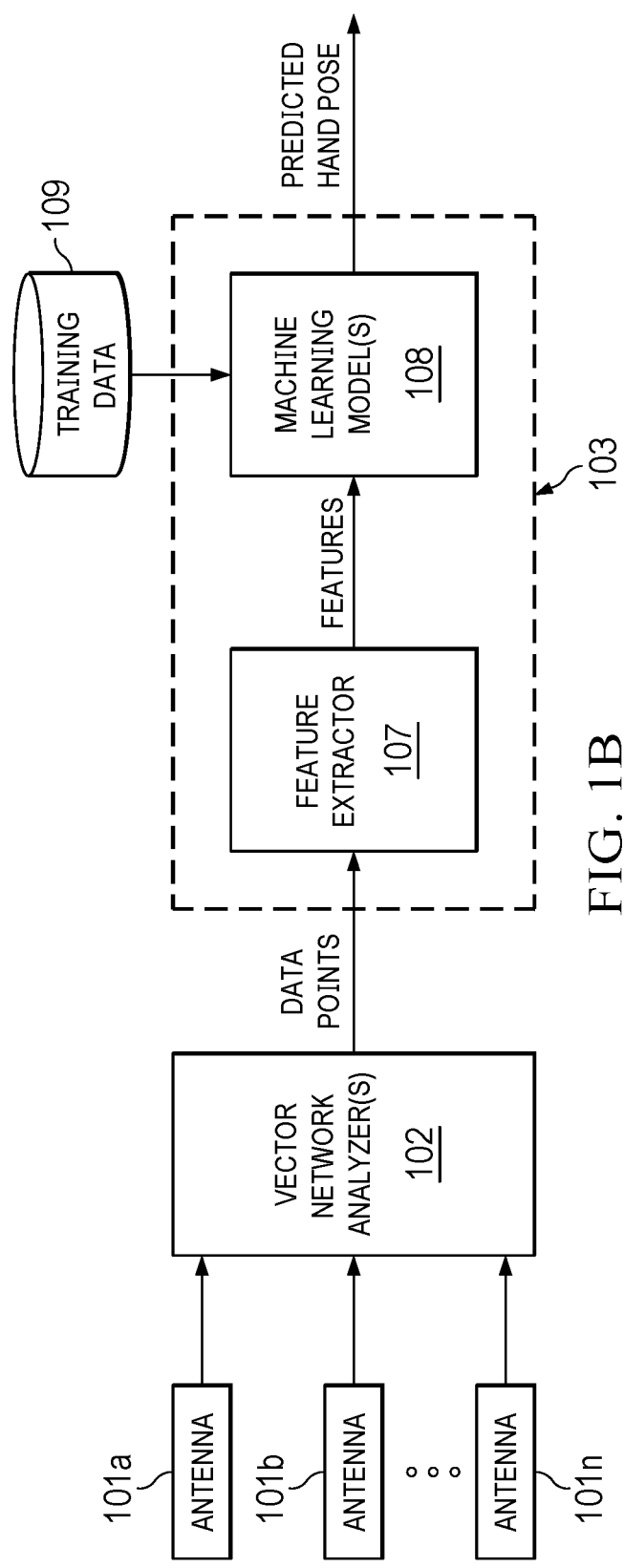
FIG. 1B is a block diagram of a hand pose tracking processing pipeline, according to an embodiment.

FIG. 1B is a block diagram of a hand pose tracking processing pipeline, according to an embodiment. The pipeline includes one or more antennas 101a . . . 101n, one or more VNAs and one or more processors 103. Processor(s) 103 runs software that implements feature extractor 107 and one or more machine learning models 108 (e.g., neural networks). Training data 109 is used to train machine learning models 108 to predict various hand poses.

In some embodiments, the software running on processor (s) 103 communicates with VNAs 102a, 102b over a serial bus (e.g., USB). To initialize itself, each VNA 102a, 102b is programmed to measure the return loss magnitude (±20 Mhz centered at 1.38 GHz) in 21 steps. The antenna resonant frequencies (lowest value of the return loss magnitude) are detected and each VNA re-centers itself on these lowest values (most often with a small phase shift) to maximize sensitivity. In some embodiments, VNAs 102a, 102b are configured to sense this frequency range continuously in an time-multiplexed fashion (to avoid interfering with one another), such that only one VNA is transmitting and measuring at a time. Each VNA measures return loss magnitude (21 data points) and phase shift (21 data points). As there are two VNAs in this example embodiment, a single complete frame of data contains 84 total data points. Accordingly, it takes approximately 410 ms to capture a complete frame of data points, resulting in a frame rate of 2.4 Hz.

For each of the 4 sets of values (two return loss magnitude arrays and two phase shift arrays), feature extractor 107 computes the first derivative (20 features×4), the index of the peak (1 feature×4), the mean, min, max and standard deviation (4 values×4). These computations result in 100 additional features available for input into a machine learning model(s) 108 (e.g., a neural network(s)). In some embodiments, using each VNA's 21 magnitude values and 21 phase shift values, the impedance at each frequency is computed, resulting in 84 additional features (21 real and 21 imaginary components×2 VNAs). For these additional features, the first derivative (20 features×4), mean and standard deviation (2 features×4) are computed. This results in another 172 features, for a grand total of 356 (84+100+172) features available as input into a machine learning model(s) 108. As described below, machine learning model(s) 108 are trained on training data 109 to predict hand poses based on the features using, for example, conventional backpropagation techniques.

Figure 2A:
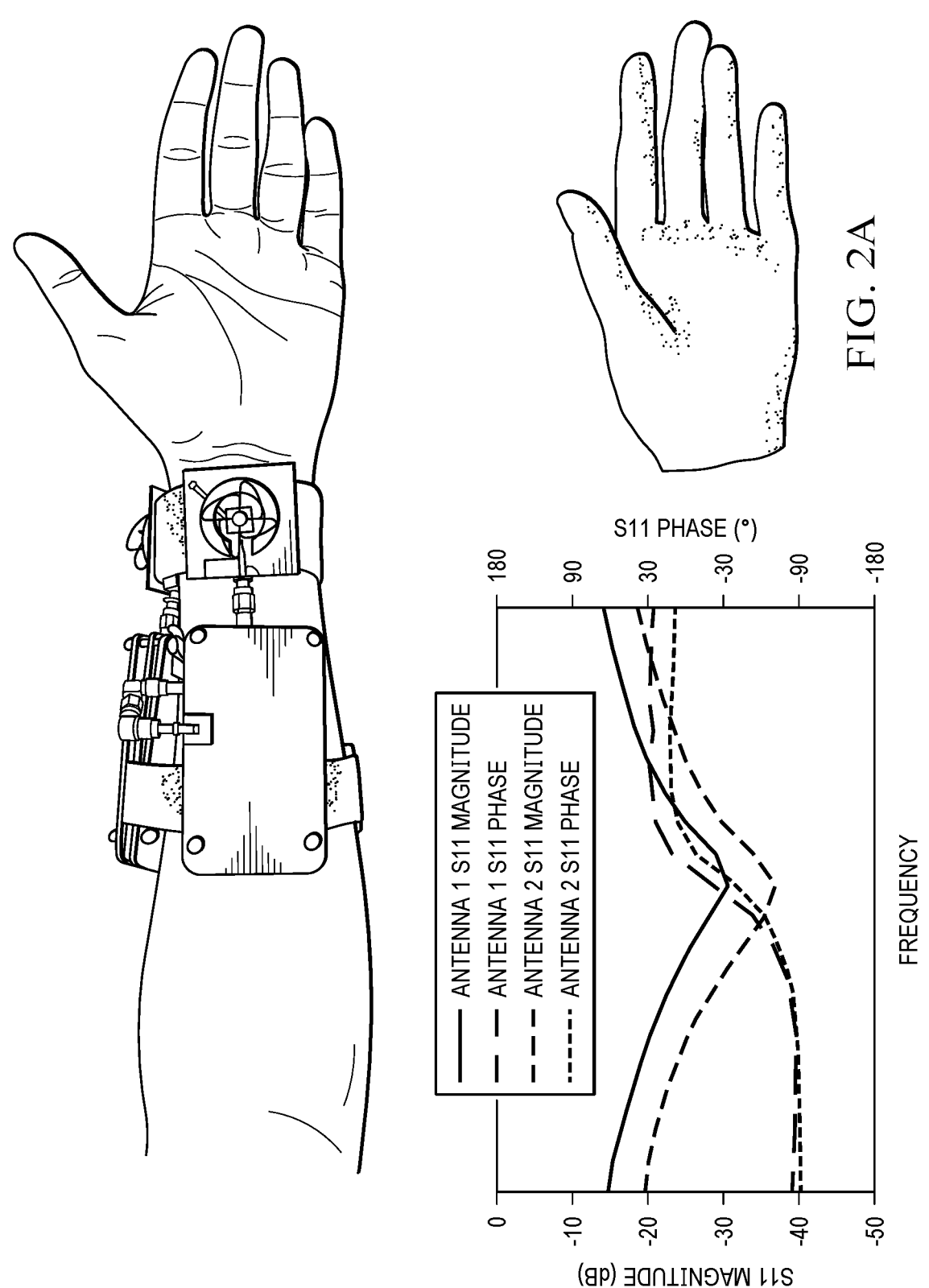
FIGS. 2A-2C illustrate the wrist-worn device of FIG. 1A measuring the swept frequency return loss of two antennas for three exemplary hand poses, according to an embodiment.
Figure 2B:
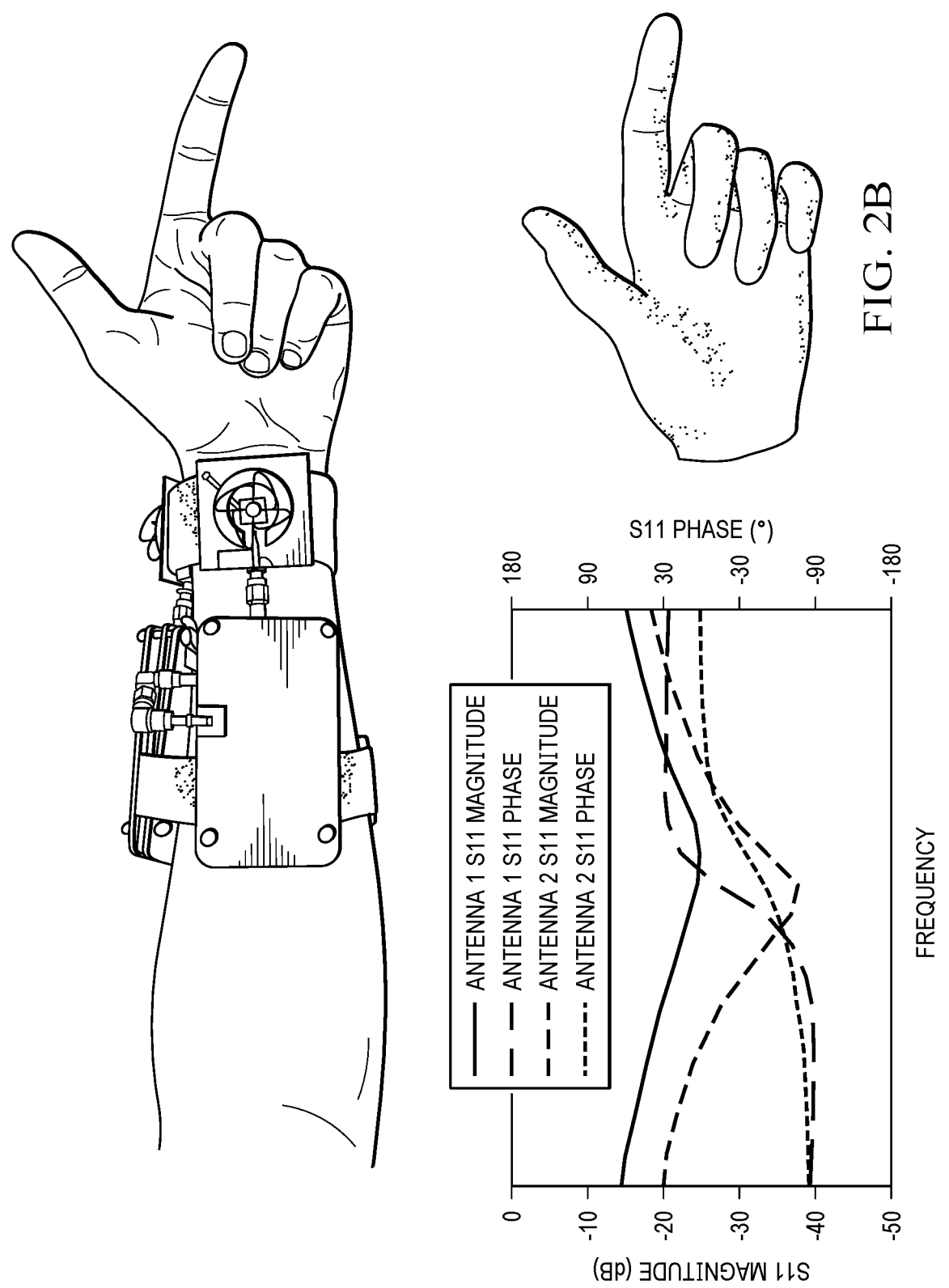
Figure 2C:
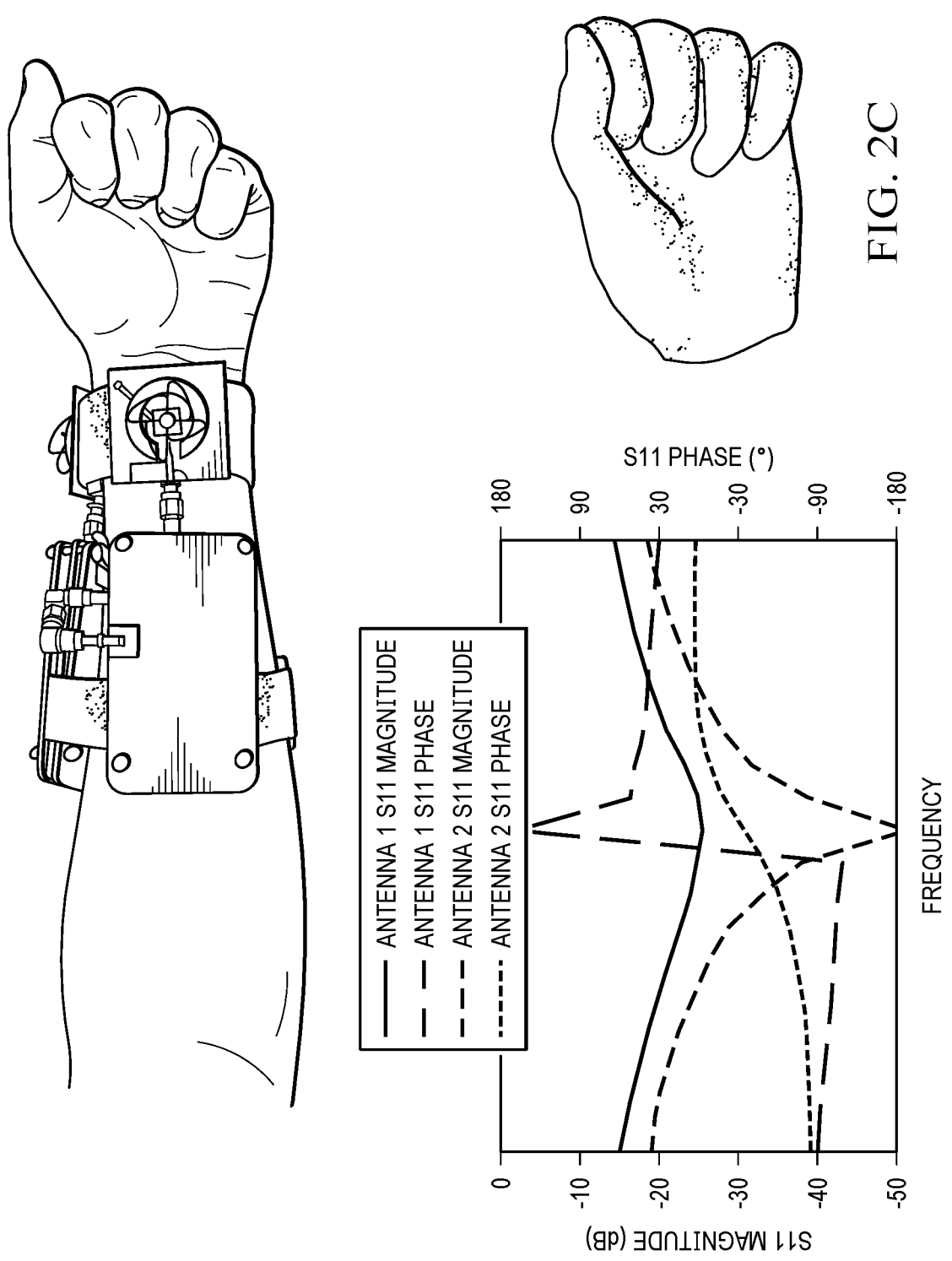
Figure 3A:
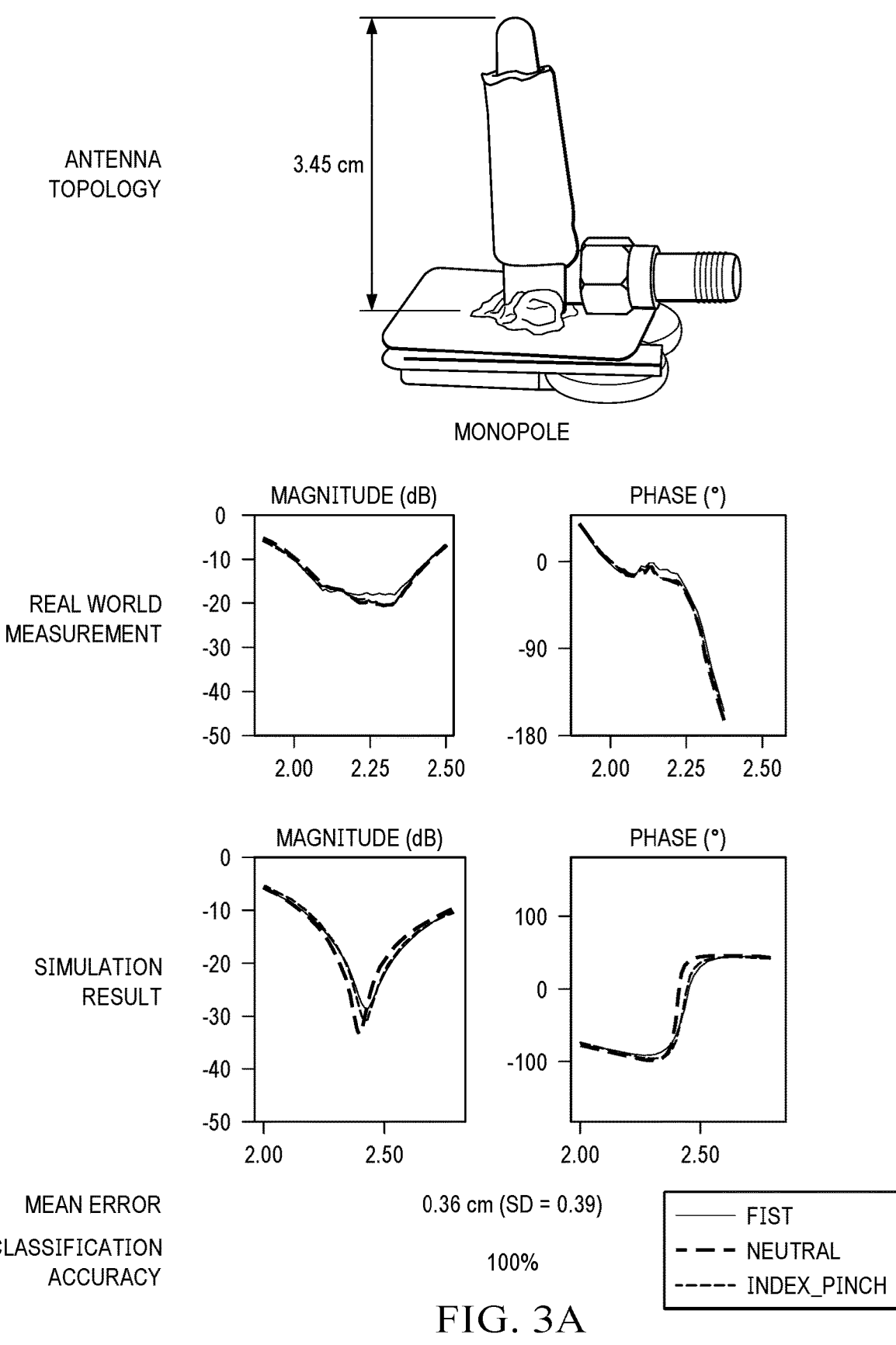
FIGS. 3A-3D illustrate results from measurements and simulations of four antenna topologies, according to an embodiment.
Figure 3B:
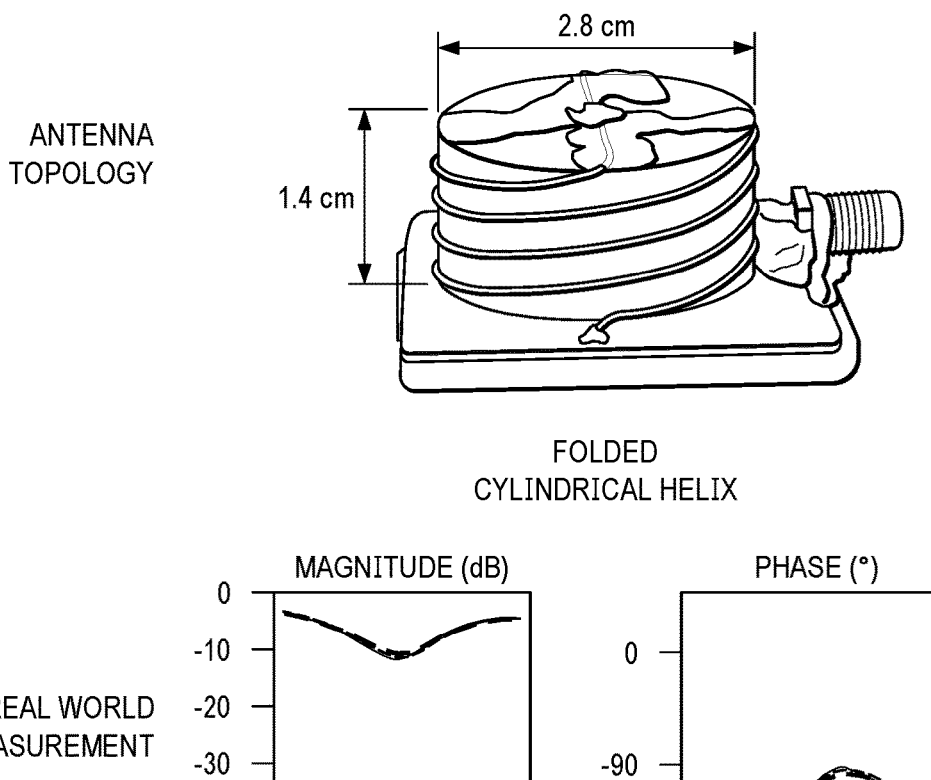
Figure 3B:
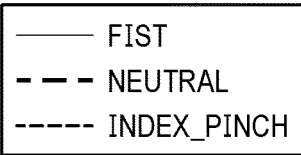
Figure 3C:
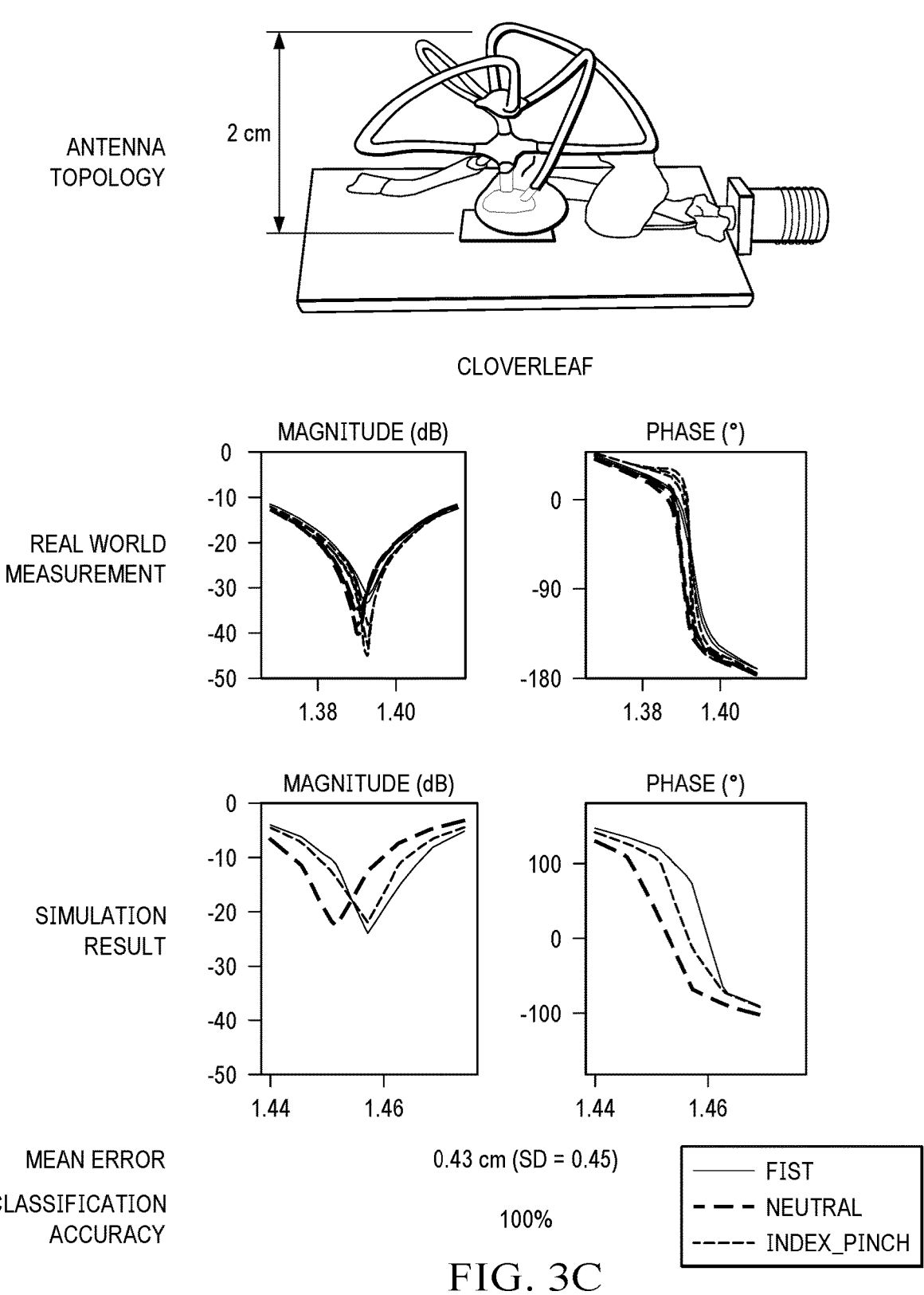
Figure 3D:
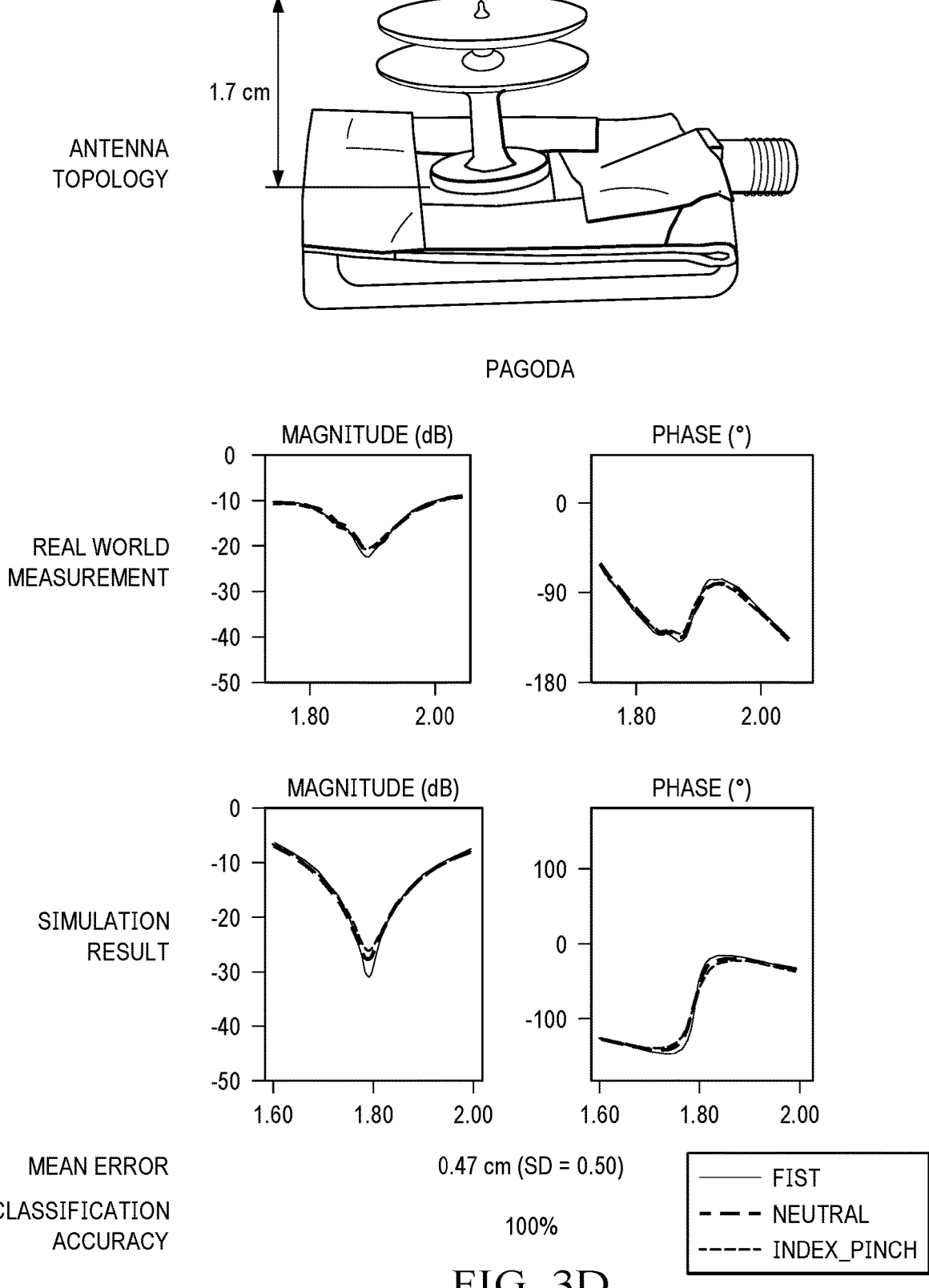
Figure 4A:
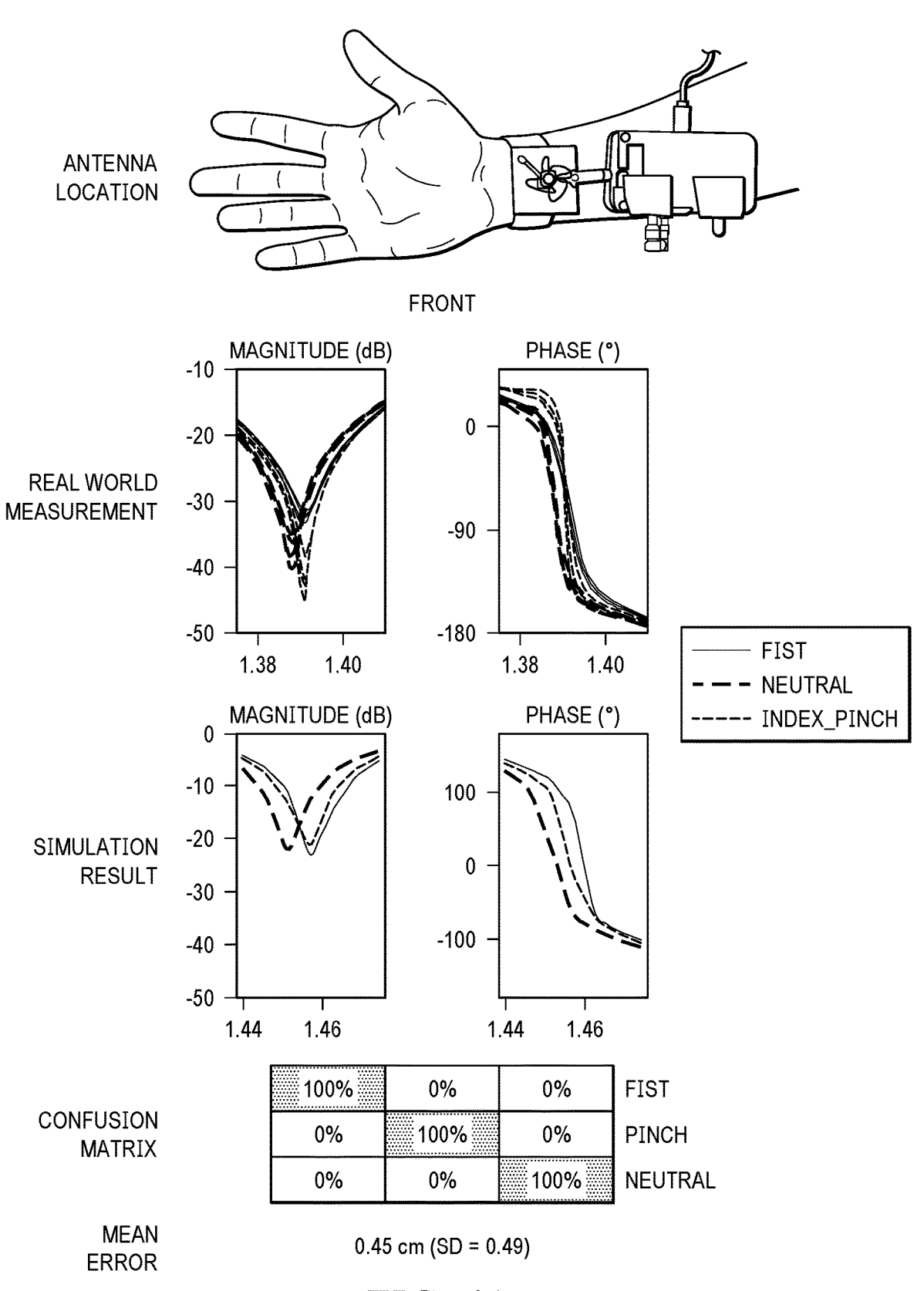
FIGS. 4A-4H illustrate results from measurements and simulations of a cloverleaf antenna placed at eight positions on the wrist, according to an embodiment.
Figure 4B:
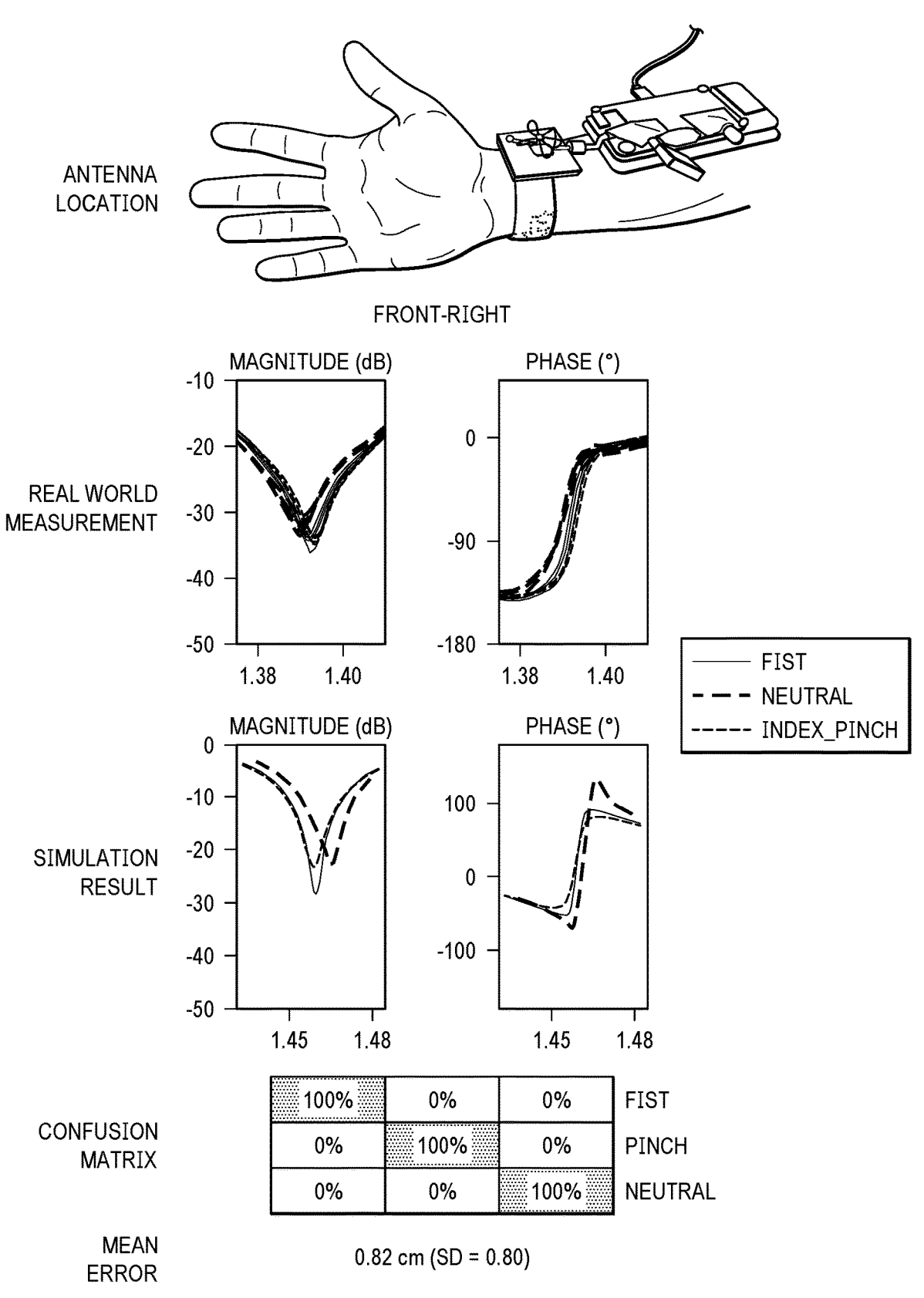
Figure 4C:
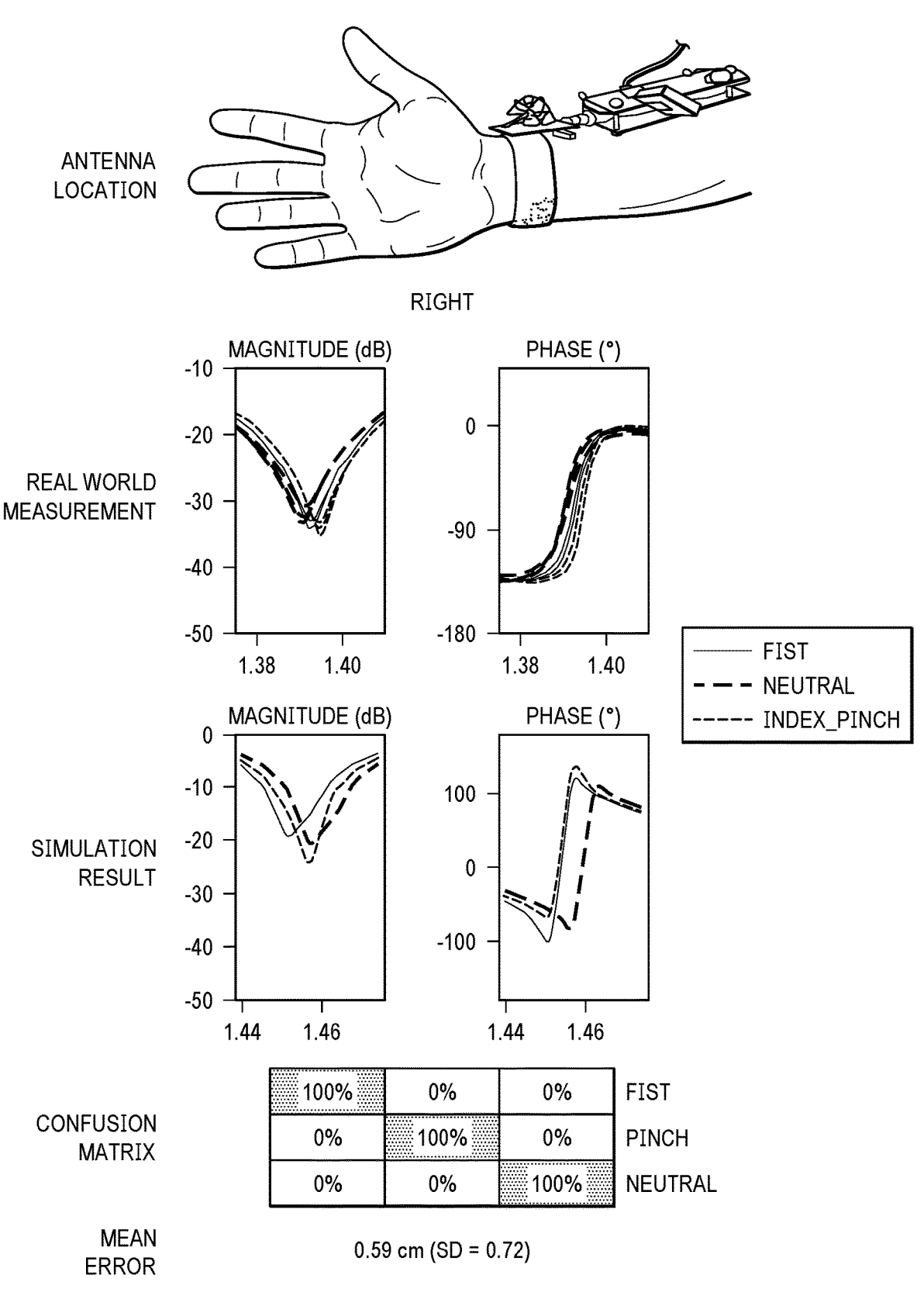
Figure 4D:
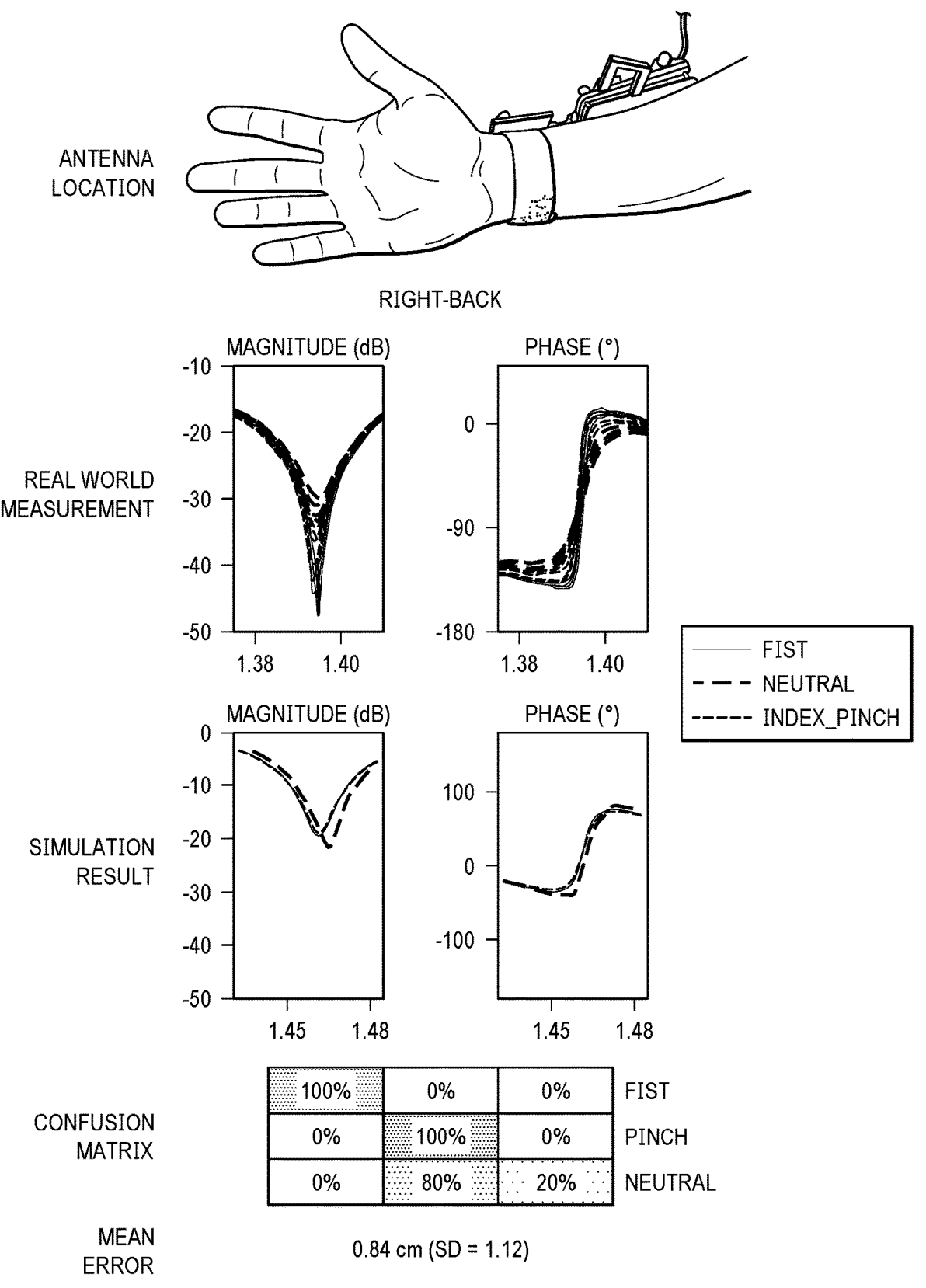
Figure 4E:
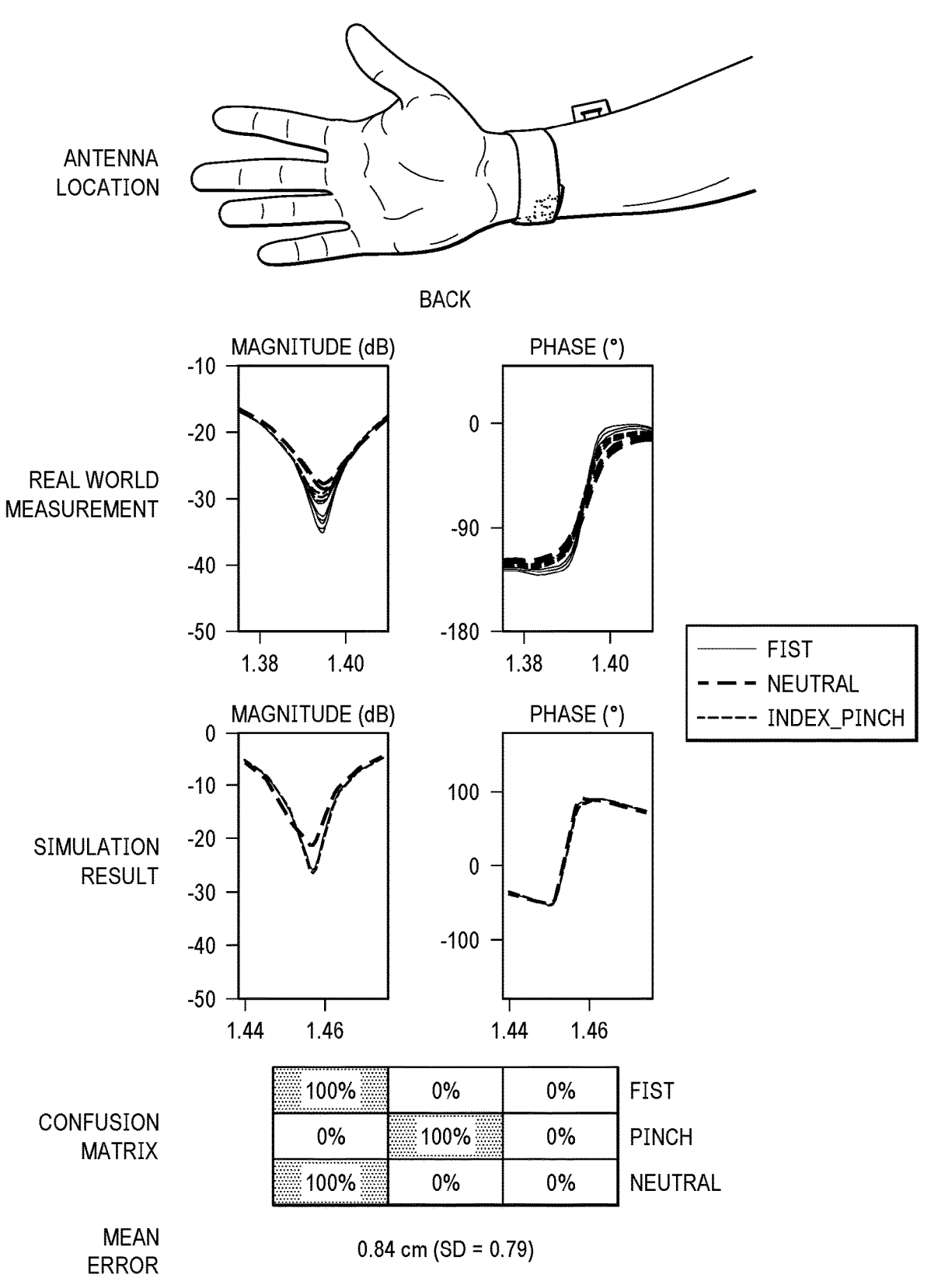
Figure 4F:
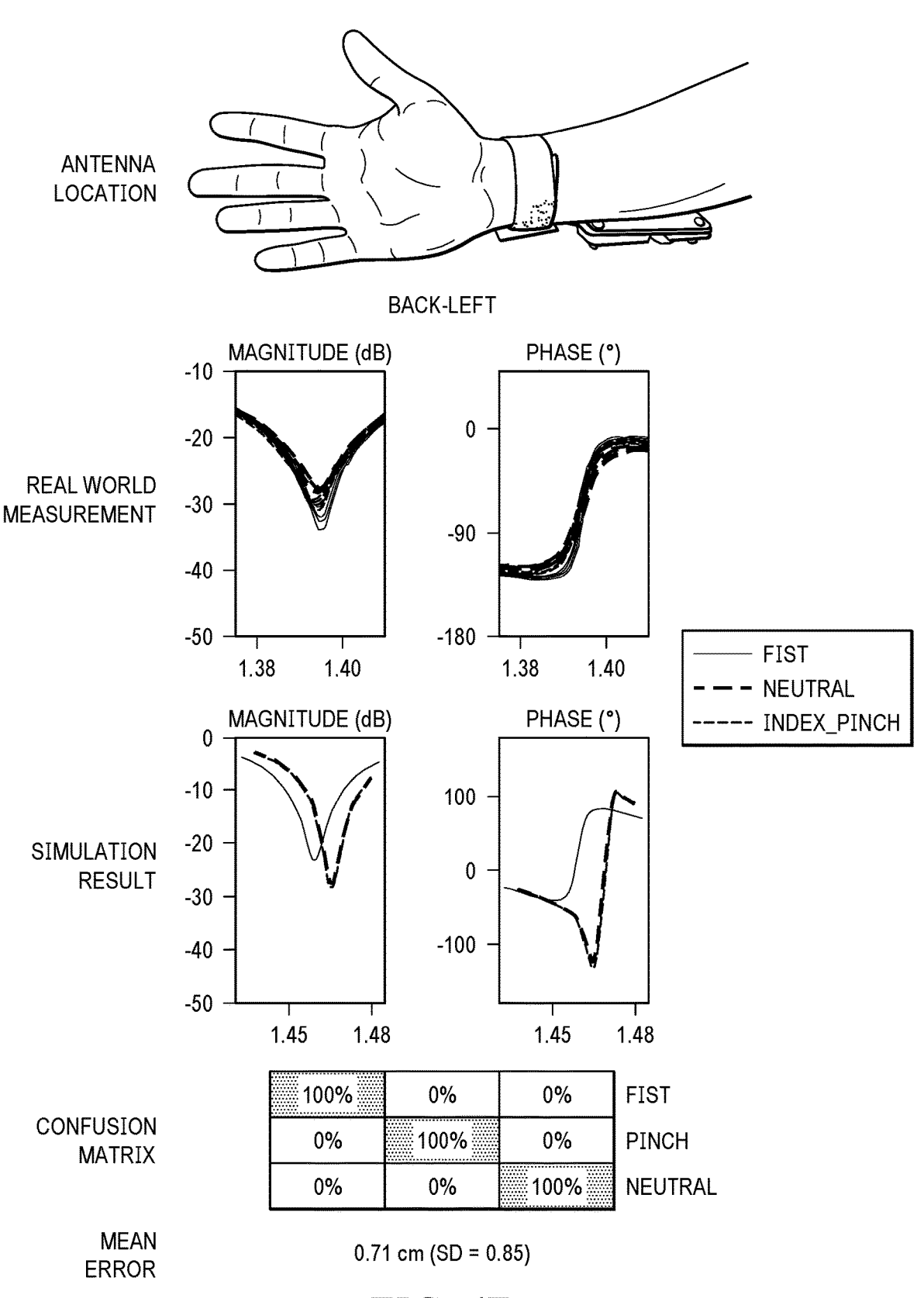
Figure 4G:
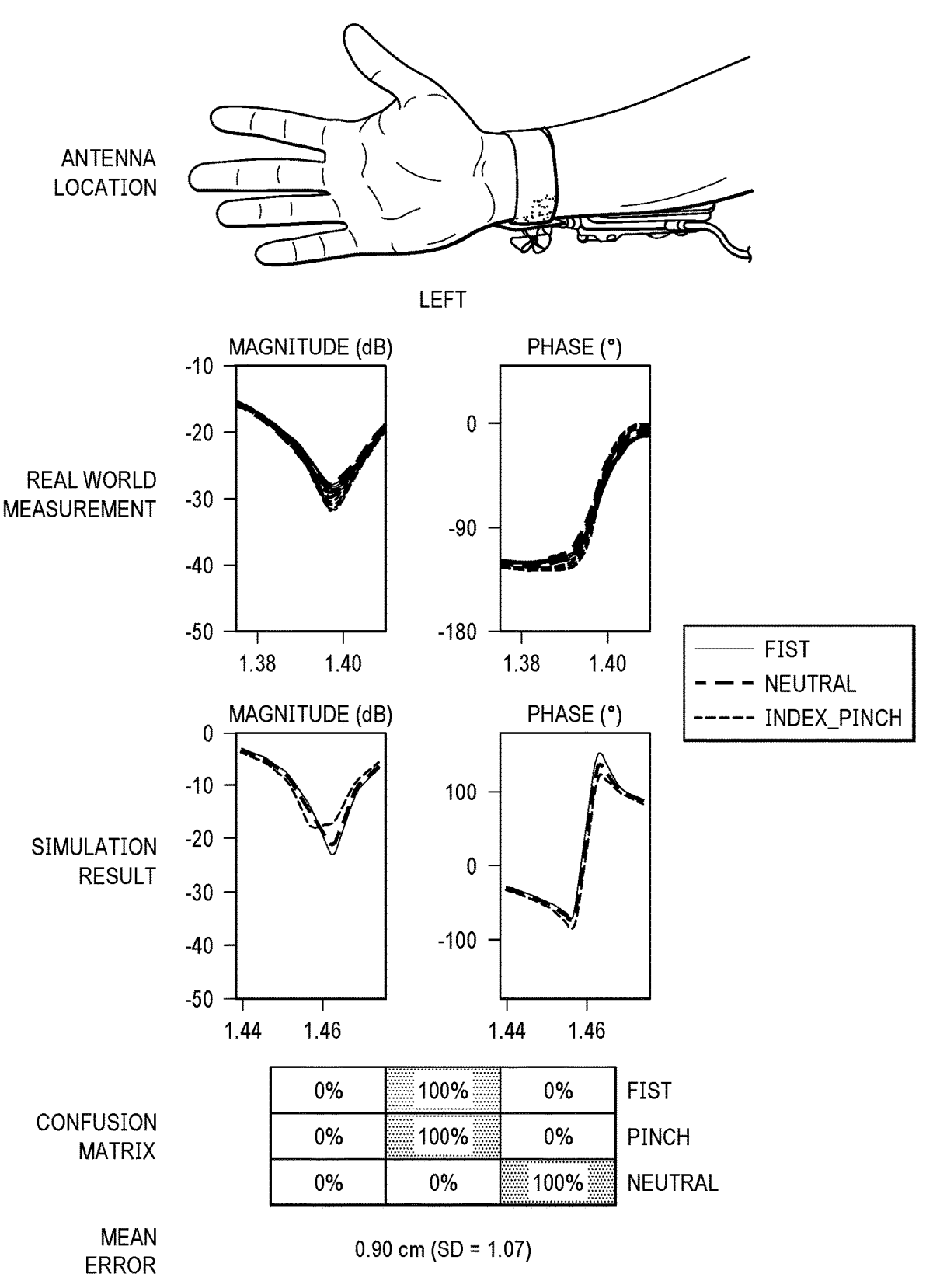
Figure 4H:
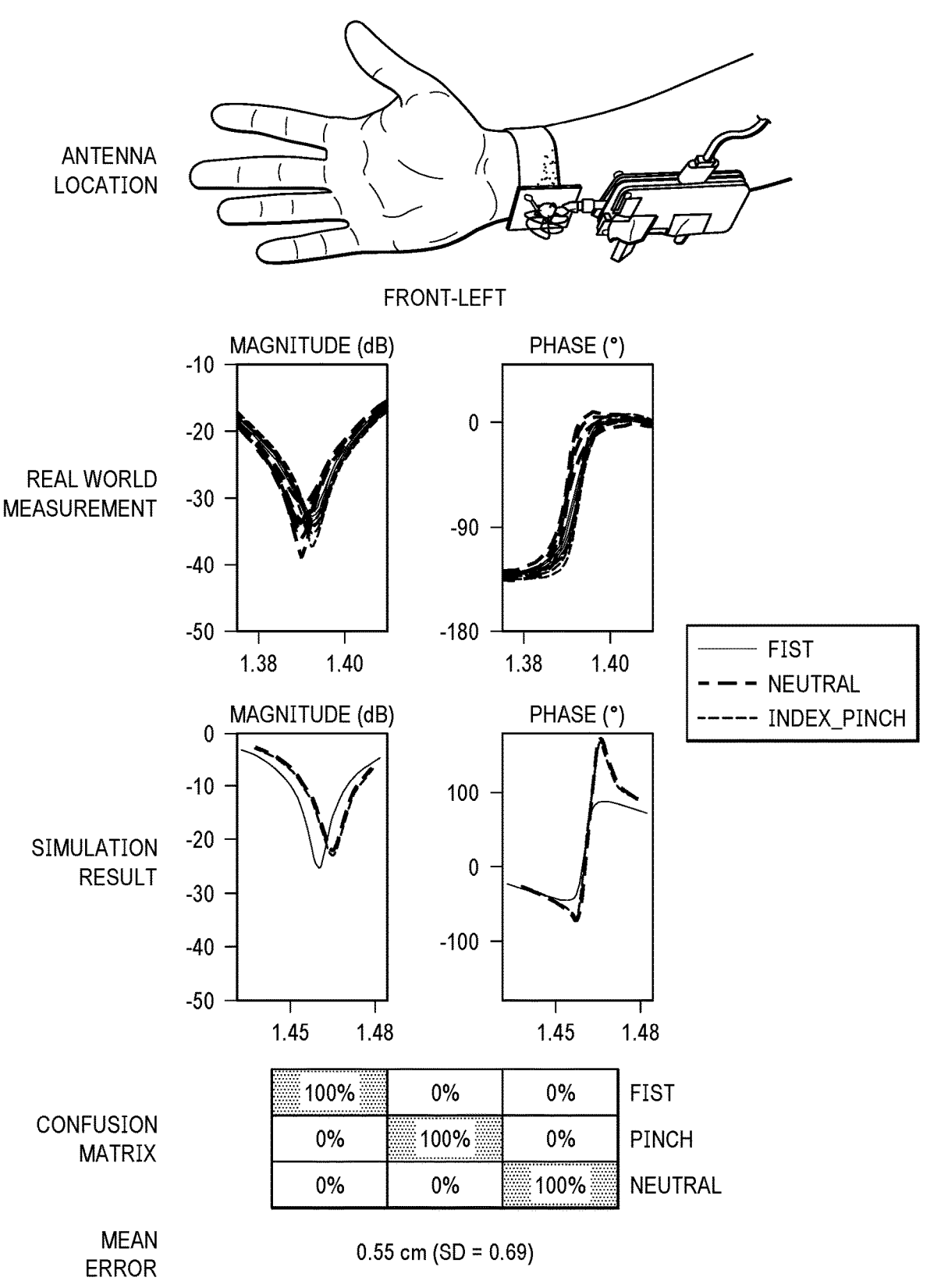
Figure 5A:
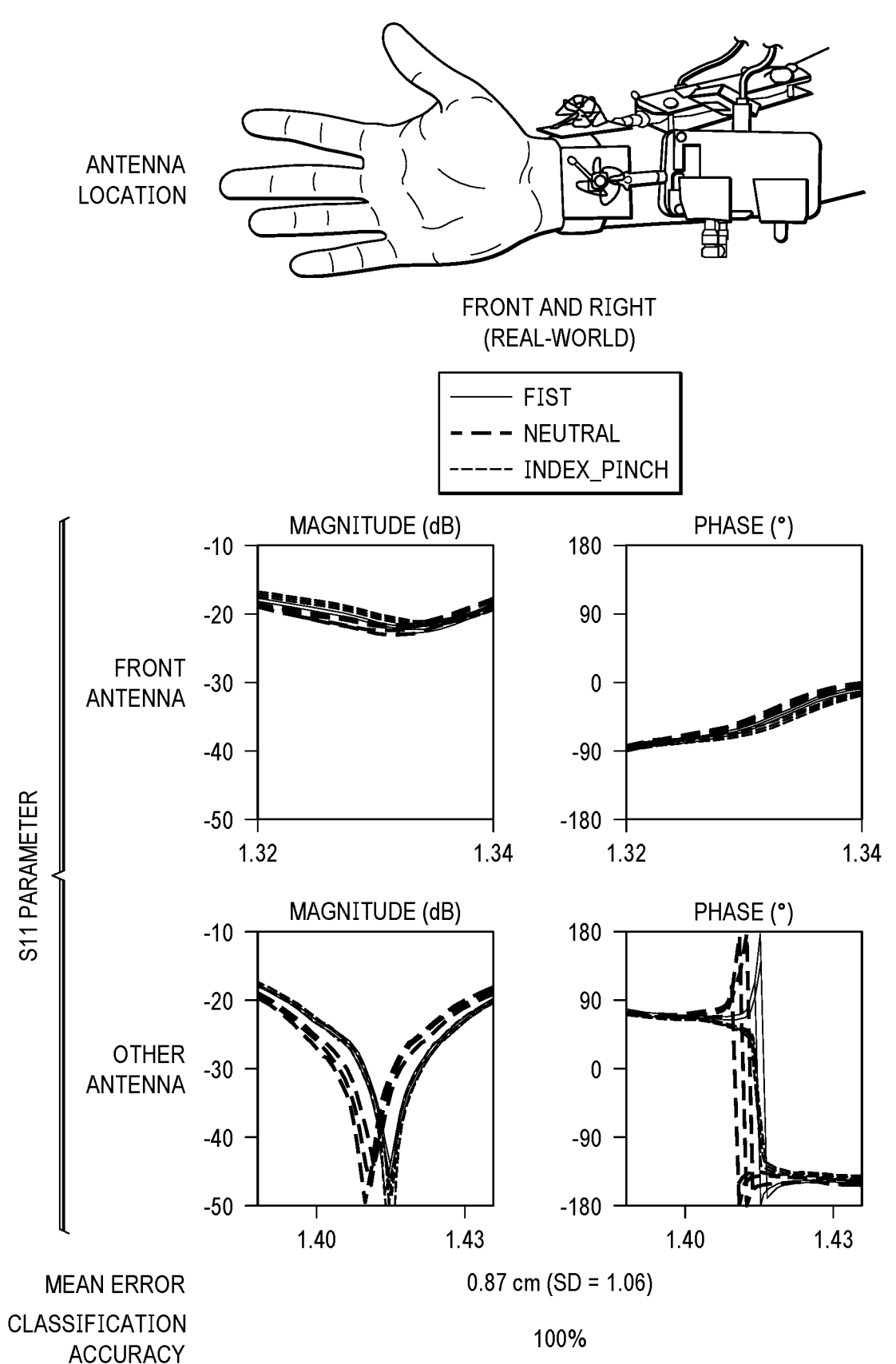
FIGS. 5A-5F illustrate results from measurements and simulations of a first cloverleaf antenna placed at the front position on the wrist, and a second cloverleaf antenna placed at one of five other positions on the wrist, according to an embodiment.
Figure 5B:
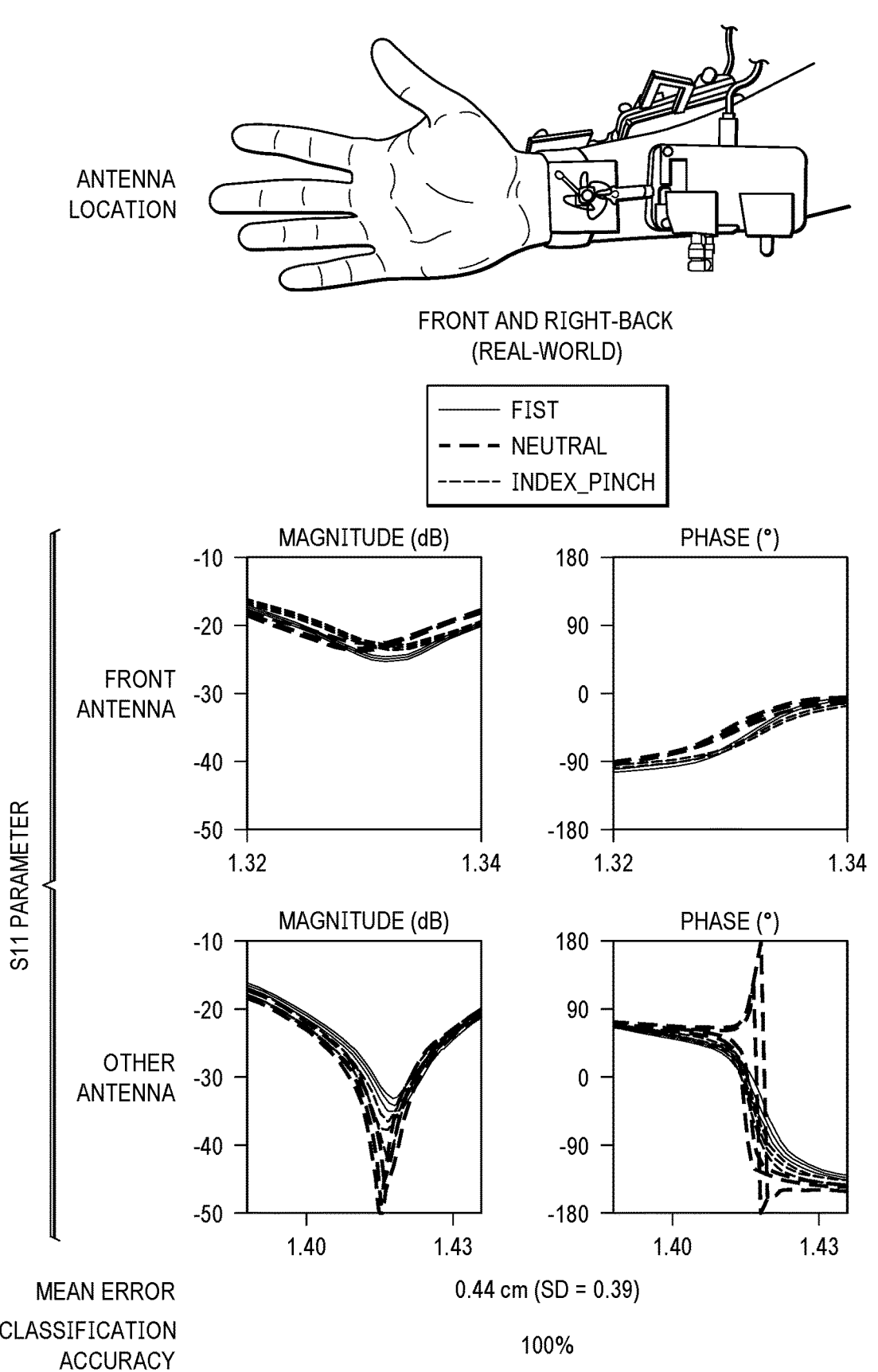
Figure 5C:
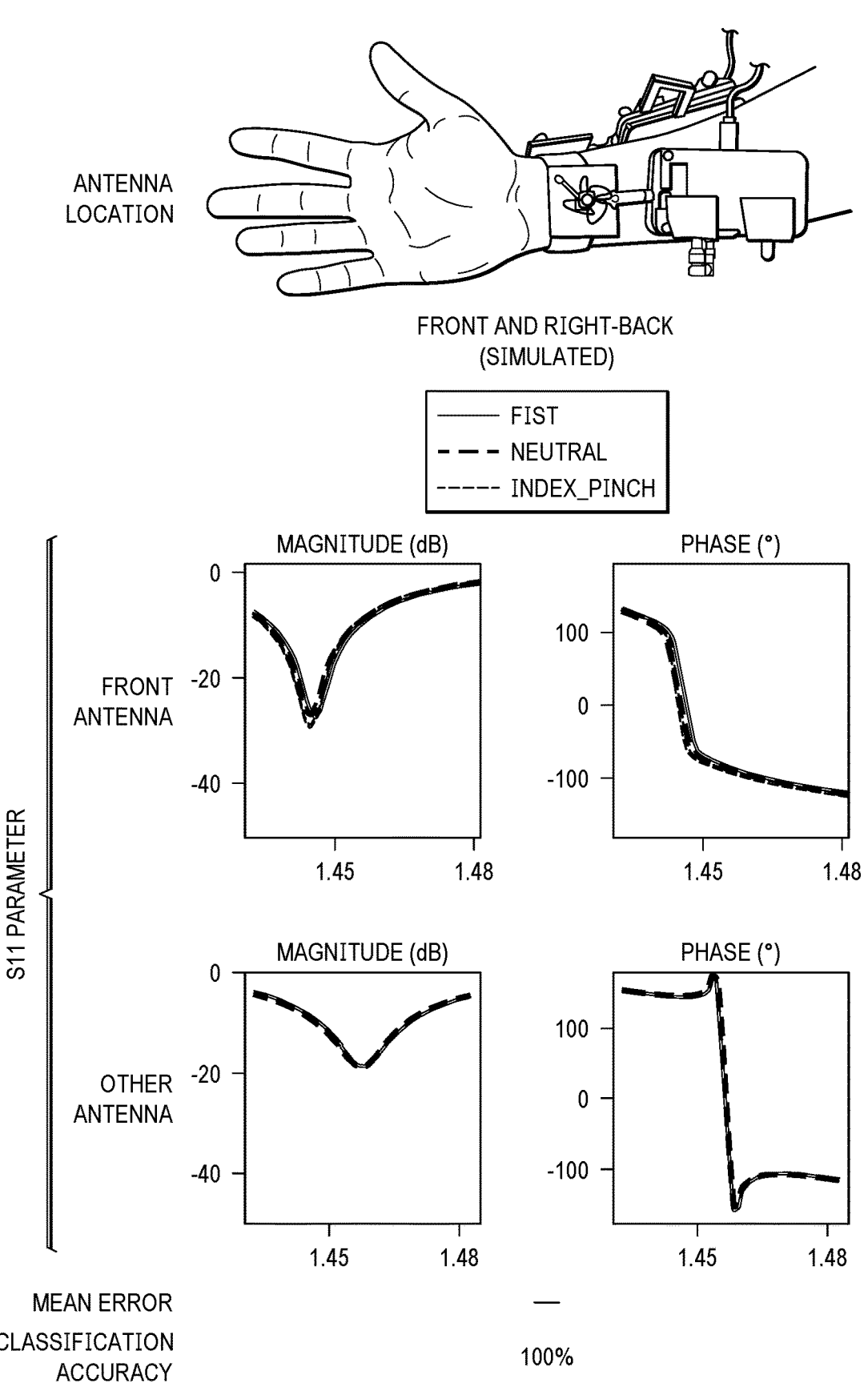
Figure 5D:
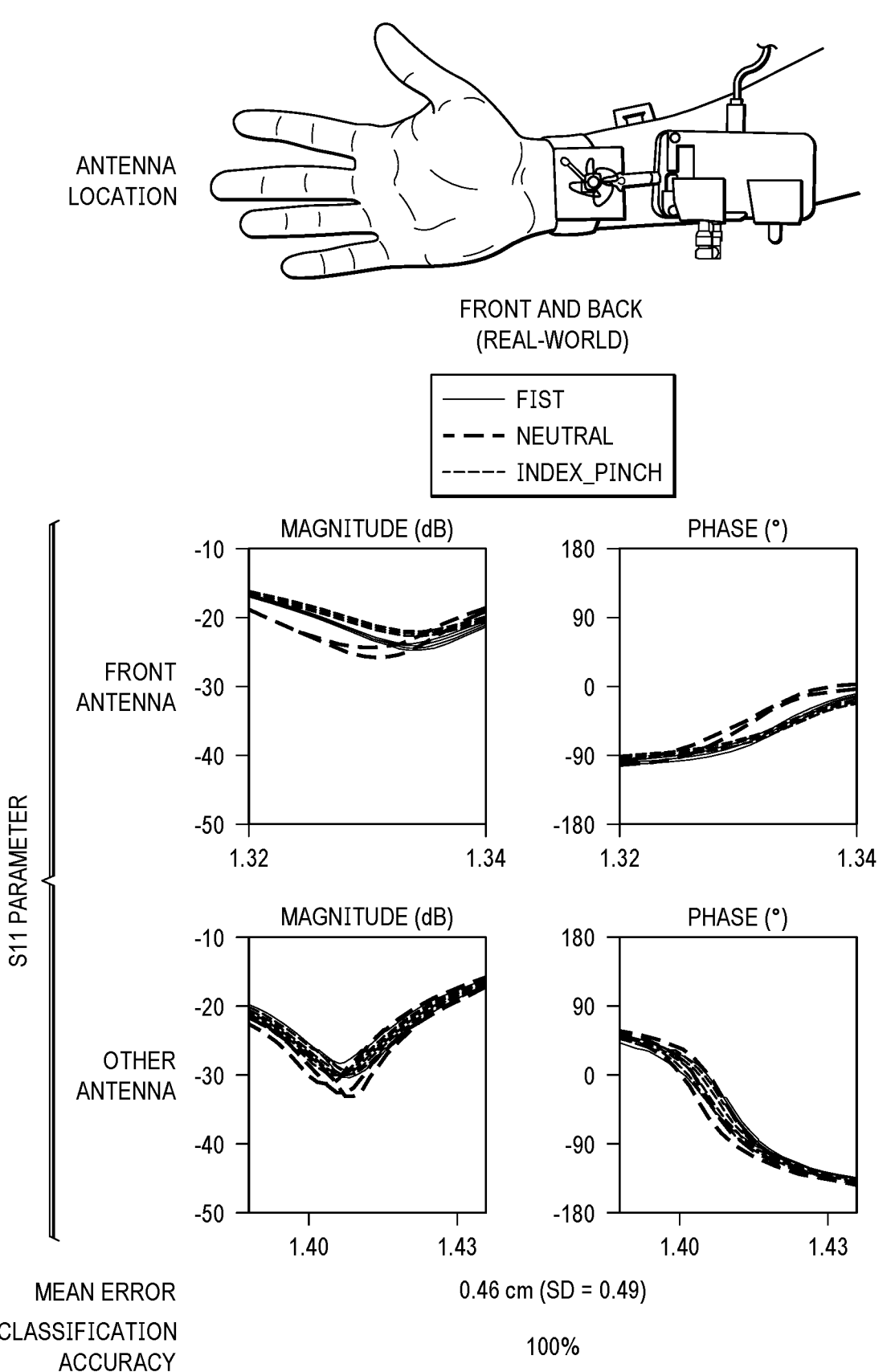
Figure 5E:
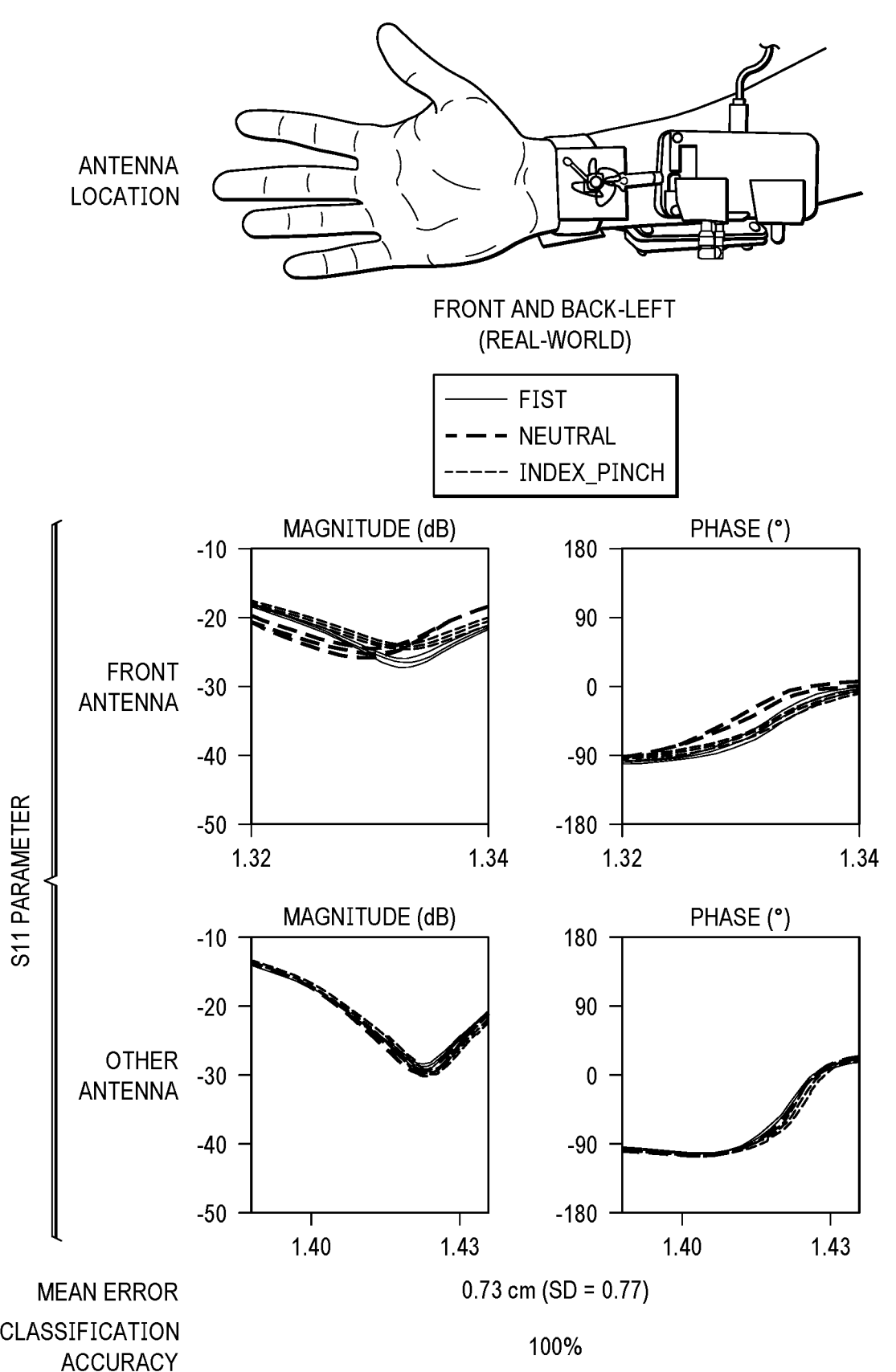
Figure 5F:
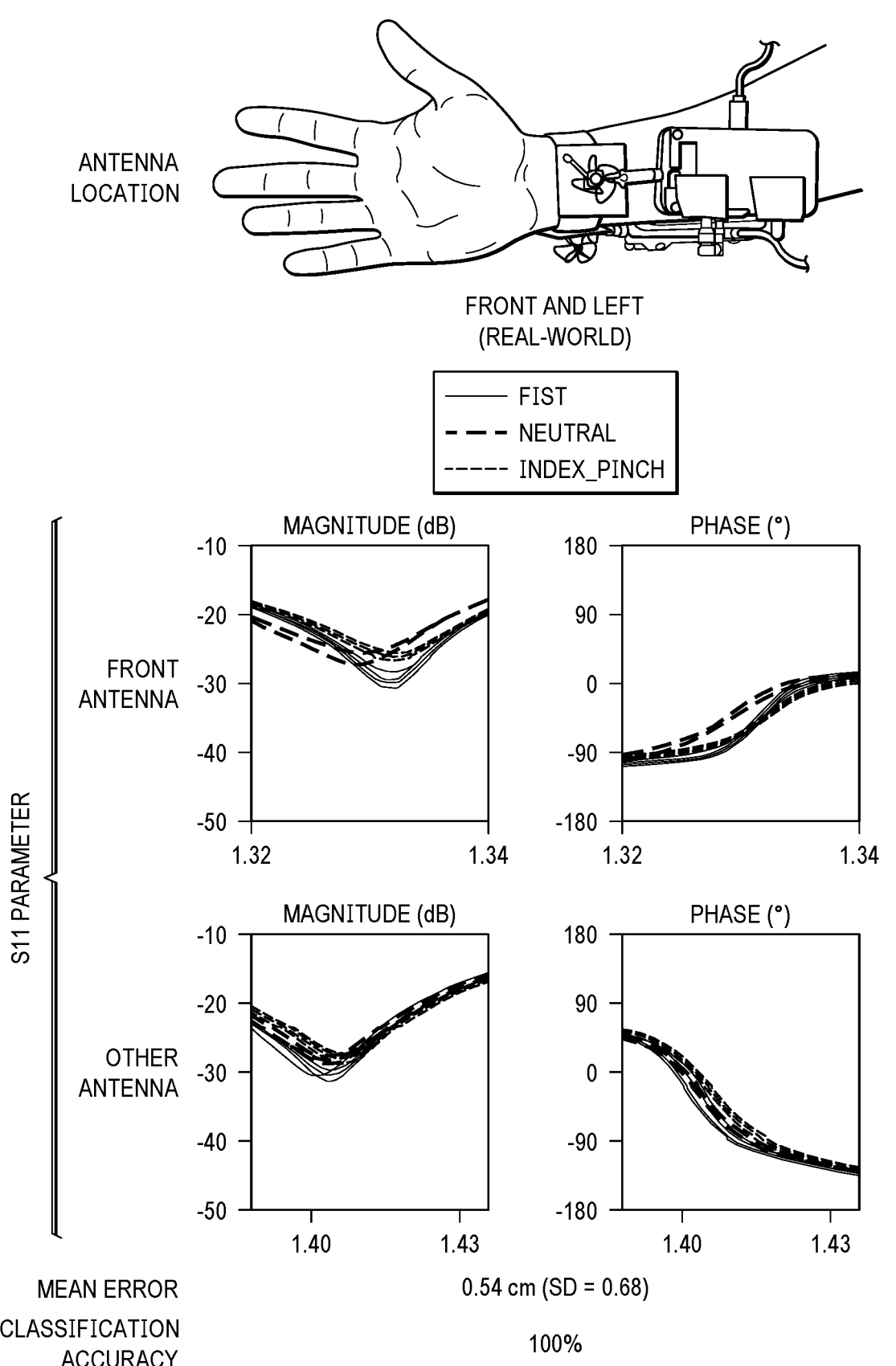

FIGS. 2A-2C illustrate the wrist-worn device measuring the swept frequency RF return loss of antennas 101a, 101b for three exemplary hand poses, which are used to pose a real-time three-dimensional (3D) hand model, according to an embodiment. The exemplary hand poses are open hand or neutral pose, thumb-to-index pinch pose and first pose. When a user's hand changes geometry (e.g., to form different hand poses), the expanded antenna ground plane formed by the user's tissue changes, therefore, changing the self-resonance of antennas 101a, 101b, consequently changing the impedance characteristics of antennas 101a, 101b observed at a predetermined frequency. Beneath each illustrated hand pose is a plot of the S11 parameter magnitude (dB) and phase (degrees) for antennas 101a and 101b as a function of frequency, and a 3D hand pose model. As can be observed, the three exemplary hand poses induced distinctive phase shifts and move the peak frequency in magnitude. As describe above, the S11 parameter magnitude and phase shift can be used to derive features for input into one or more machine learning models that are trained to predict hand poses.

Example Input Modalities & Machine Learning Models

In an embodiment, the input modality is a three-dimensional (3D) hand pose as demonstrated in systems described in Yasha Iravantchi, Mayank Goel, and Chris Harrison. 2019. BeamBand: Hand gesture sensing with ultrasonic beamforming. In Proceedings of the 2019 CHI Conference on Human Factors in Computing Systems. 1-10, and Yang Zhang and Chris Harrison. 2015. Tomo: Wearable, low-cost electrical impedance tomography for hand gesture recognition. In Proceedings of the 28th Annual ACM Symposium on User Interface Software & Technology. 167-173.

In an embodiment, the input modality is 2DOF wrist angle input as demonstrated in WristWhirl described in Jun Gong, Xing-Dong Yang, and Pourang Irani. 2016. Wristwhirl: One-handed continuous smartwatch input using wrist gestures. In Proceedings of the 29th Annual Symposium on User Interface Software and Technology. 861-872 and RotoWrist described in Farshid Salemi Parizi, Wolf Kienzle, Eric Whitmire, Aakar Gupta, and Hrvoje Benko. 2021. RotoWrist: Continuous Infrared Wrist Angle Tracking using a Wristband. In Proceedings of the 27th ACM Symposium on Virtual Reality Software and Technology. 1-11.

In an embodiment, a third input modality is fine-grained finger input (sometimes called "micro-gestures"), described in: Jaime Lien, Nicholas Gillian, M Emre Karagozler, Patrick Amihood, Carsten Schwesig, Erik Olson, Hakim Raja, and Ivan Poupyrev. 2016. *Soli*: Ubiquitous gesture sensing with millimeter wave radar. ACM Transactions on Graphics (TOG) 35, 4 (2016), 1-19; Myoungseok Yu, Narae Kim, Yunho Jung, and Seongjoo Lee. 2020. A frame detection method for real-time hand gesture recognition systems using CW-radar. Sensors 20, 8 (2020), 2321; Gierad Laput and Chris Harrison. 2019. Sensing fine-grained hand activity with smartwatches. In Proceedings of the 2019 CHI Conference on Human Factors in Computing Systems. 1-13; Joseph Paradiso, Craig Abler, Kai-yuh Hsiao, and Matthew Reynolds. 1997. The magic carpet: physical sensing for immersive environments. In CHI'97 Extended Abstracts on Human Factors in Computing Systems. 277-278; and Arthur Sluyters, Sebastien Lambot, and Jean Vanderdonckt. 2022. Hand Gesture Recognition for an Off-the-Shelf Radar by Electromagnetic Modeling and Inversion. In 27th International Conference on Intelligent User Interfaces. 506-522.

Each of these input modalities requires a different model and training pipeline, as described in turn below.

Continuous 3D Hand Pose Input Modality

For the 3D model, in some embodiments a SciPy™ ExtraTreesRegressor model (default parameters, 100 estimators) is used to predict 21 hand keypoints. The input vector into the model includes the last N (e.g., N=3) frames of feature data. Ground truth 3D hand keypoints are captured using, for example, MediaPipe Hands described in Camillo Lugaresi, Jiuqiang Tang, Hadon Nash, Chris McClanahan, Esha Uboweja, Michael Hays, Fan Zhang, Chuo-Ling Chang, Ming Guang Yong, Juhyun Lee, et al. 2019. Mediapipe: A framework for building perception pipelines. arXiv preprint arXiv:1906.08172 (2019), and a webcam operating 30 cm below the user's hands. In some embodiments, the Mano Library, described in Javier Romero, Dimitrios Tzionas, and Michael J. Black. 2017. Embodied Hands: Modeling and Capturing Hands and Bodies Together. ACM Transactions on Graphics, (Proc. SIGGRAPH Asia) 36, 6 (November 2017), is used to produce the animated 3D hand meshes shown in FIGS. 2A-2C and FIG. 8 (bottom row).

Continuous 2DOF Wrist Angle Input Modality

To capture training data for wrist angle, the same setup as 3D hand pose (MediaPipe Hands+webcam) is used. As a proxy for 2DOF wrist angle, the palm normal is computed using MediaPipe's wrist, index finger mcp, and pinky mcp keypoints. The ExtraTreesRegressor model (default parameters, 1000 estimators) is used to predict the wrist pitch and yaw (see FIG. 9, bottom row). In some embodiments, the most recent N (e.g., N=3) three frames of featured data from writs-worn device 100 are used as the input vector.

Micro-Gestures Input Modality

As one example of micro-gesture input, the thumb's position relative to the other four fingers is tracked, held together and acting like a trackpad. The model (ExtraTrees-Regressor, default parameters, 1000 estimators) is trained on discrete hand locations presented visually on a computer monitor. Once trained on this grid of data, the model can interpolate to provide continuous tracking. Some examples of micro-gestures include but are not limited to: hovering, touching and using the thumb and index finger like a slider.

Antenna Topologies

FIGS. 3A-3D illustrate results from measurements and simulations across four antenna topologies, according to an embodiment. The four antennas topologies include: basic monopole, cloverleaf, pagoda and folded cylindrical helix. All four antenna topologies produces an anisotropic radiation pattern in-plane with the users' arm, which envelops the volume where the user's hand operates.

With these four antenna topologies, real world experiments were conducted to see how three exemplary hand poses (open hand, thumb-to-index pinch, first) altered the antennas self-resonance, and therefore its complex characteristic impedance. Additionally, matching software simulations were run for all antennas but the folded cylindrical helix antenna. For all of these experiments (real and simulated) the antenna position was held constant: centered on the arm, just below the wrist crease, which is defined as the "front" position on the wrist, as shown in FIGS. 4A-4H.

Referring to FIGS. 4A-4H, an overview of the real world experiments are shown. The third row is the simulated antenna S11 data (one curve for each hand pose), while the second row shows all 15 trials (5 repeats×3 frames) for each of the hand poses as performed by a real user. While there are minor differences between the simulated and real-world data, the main result is apparent. All antennas change their impedance characteristic in response to the different hand poses, though perhaps most dramatically with the cloverleaf antenna, with almost a 50 dB radiated at its resonant frequency.

To test how the measured signal impacted machine learning accuracy, five rounds of real hand pose data were used to train and test a continuous hand model (e.g., using leave-one-round-out cross validation). The model's pose predictions were compared against the MediaPipe-captured ground truth and the mean per-joint position error (MPJPE) was computed, which is reported in the fourth row of FIGS. 4A-4H. Additionally, a classification model was trained that predicts the three discrete hand poses, which is reported in the bottom row of FIGS. 4A-4H. All four antennas had 100% classification accuracy, and so confusion matrices are not shown.

Based on the real world experiments, all four antenna designs were able to accurately predict hand poses, especially in the discrete pose classification task. The monopole antenna performed best in a machine learning evaluation, but its inherently tall profile was a significant detractor.

Balancing accuracy and feasibility, the cloverleaf antenna was used in wrist-worn device 100, which performed second best in machine learning evaluation, demonstrated the most salient differences in its S11 data and offered a compact geometry. In other embodiments, the other antenna designs may be used and/or a combination of different antenna designs.

In an embodiment, device 100 includes: 1) at least two antennas with different topologies; 2) at least two antennas with different resonant frequencies; 3) at least two antennas with different polarization; 4) at least two antennas with different antenna radiation patterns; 5) at least two antennas with different quality factors; 5) a distributed antenna array of two or more antennas; 6) at least two antennas that are coupled to the device such that they radiate in opposite directions.

Figure 6A:
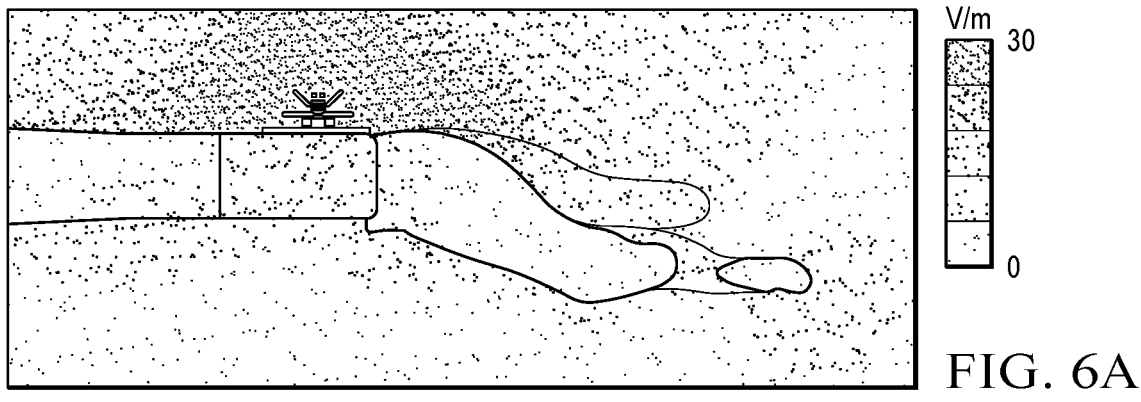
FIGS. 6A-6C illustrate simulation of electric field distribution for a cloverleaf antenna at the front position for three exemplary hand poses, according to an embodiment.
Figure 6B:
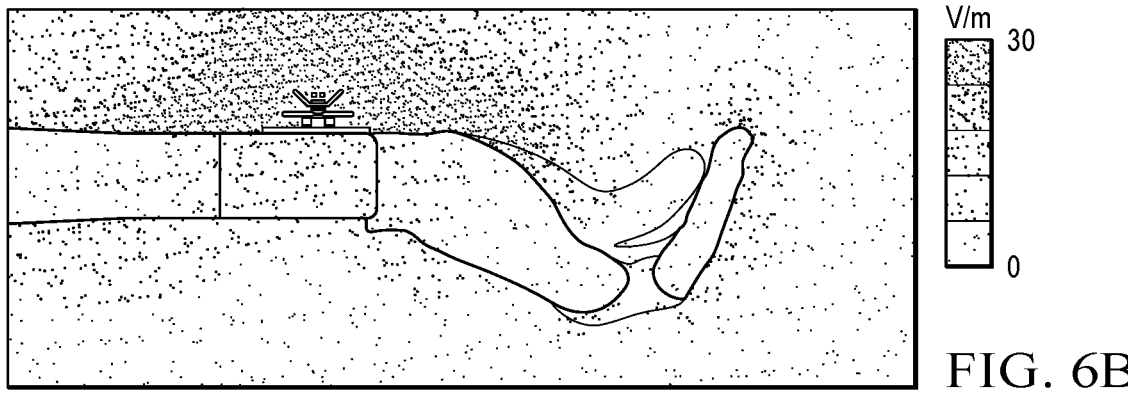
Figure 6C:
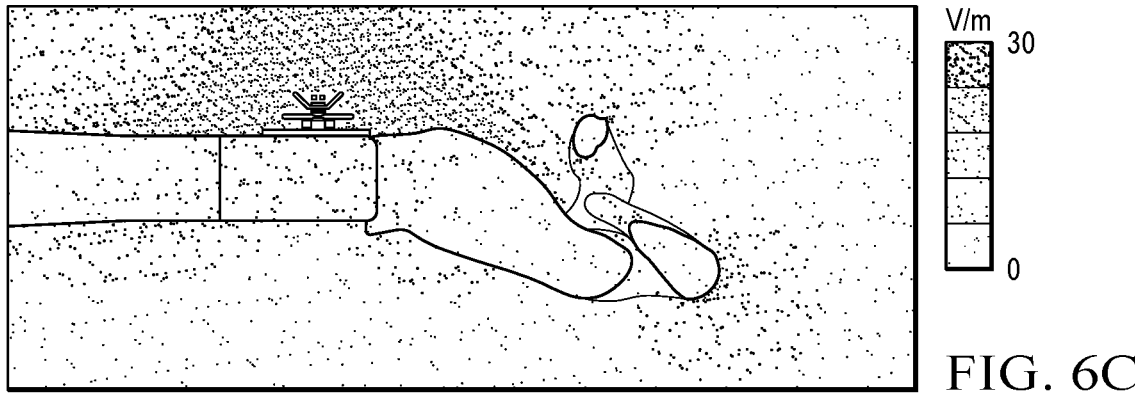

FIGS. 6A-6C illustrate simulation of electric field distribution for a cloverleaf antenna at the front position for three exemplary hand poses, according to an embodiment. To better understand how the cloverleaf antenna's electric field was being altered by the three hand poses the electric field distribution was simulated and rendered alongside the phantom. It can be observed that in the open hand or neutral hand pose, the electric field distribution at the fingers is reduced, with a small concentration at the middle finger tip. In the thumb-to-index pinch pose, the electric field is more evident along the length of the fingers, with an even higher concentration at the fingertip. Finally, in the first pose, a different electric field distribution is observed with high concentration at the thumb knuckle and index finger tip.

These electric field simulation results support the hypotheses that changes to antenna impedance characteristics are resultant from the coupled ground plane's (e.g., forearm and hand) morphology changes. If the extended coupled ground plane created by the forearm and hand would be electrically infinite (e.g., larger than several wavelengths), changes in the electric field distribution would not be noticed or appear in the antenna characteristic impedance.

Antenna Location

With an antenna topology selected, the impact of body location on antenna signal was analyzed using a combination of software simulation and real world measurements. Holding other parameters constant, eight body placements were tested: front, front-left, left, left-back, back, back-right, right, and front-right. FIGS. 4A-4H show the real-world and simulated S11 plots across the eight positions, along with classification and mean joint position error. Coincidentally, the front position performed best, with 100% classification accuracy for the three exemplary poses and the lowest joint error (0.45 cm). The S11 plots also showed the most expressivity in response to the three hand poses. For these reasons, the front position was used in wrist-worn device 100.

Secondary Antenna Location

FIGS. 5A-5F illustrate results from measurements and simulations of a first cloverleaf antenna placed at the front position on the wrist, and a second cloverleaf antenna placed at one of five other positions on the wrist, according to an embodiment. After selecting the front position to host a cloverleaf antenna, it was apparent there was sufficient space on the backside of the wrist to host a second antenna. However, as the two antenna will interact with one another, it was not as straightforward as selecting the next-bestperforming antenna. To give more confidence and clarity in antenna selection, another set of simulations and real world measurements were run. This time, all conditions included a frontal cloverleaf antenna, and a second cloverleaf antenna were tested in five possible positions (left, left-back, back, right-back, and right). Front-left and front-right positions were not possible, as the antennas could not physically fit side-by-side on our wristband.

Figure 7A:
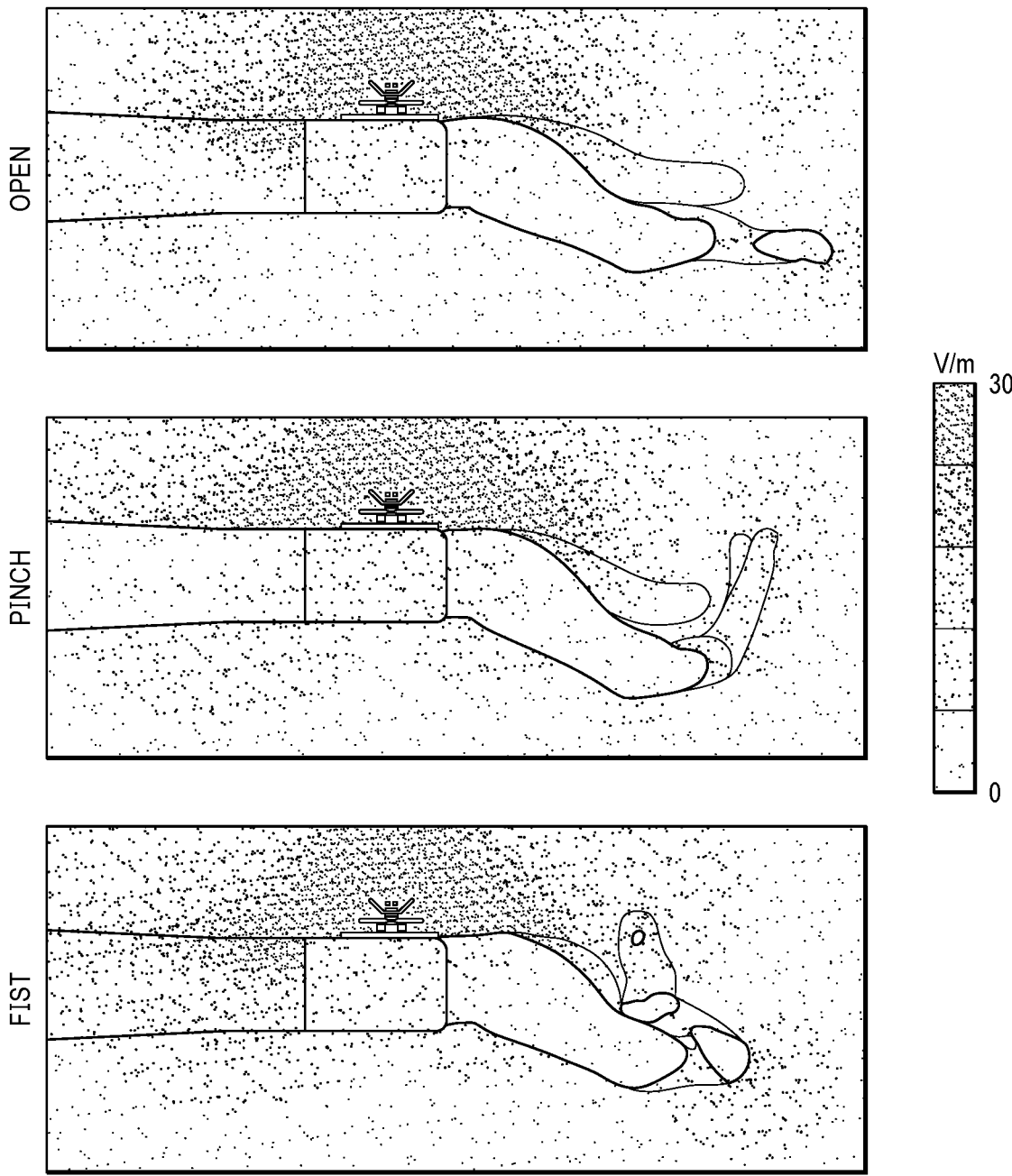
FIGS. 7A and 7B illustrate simulated electric field intensity distribution at resonance frequency when one antenna is placed at the front position on the wrist and the other antenna is placed at the left-back position on the wrist for three exemplary hand poses, according to an embodiment.
Figure 7B:
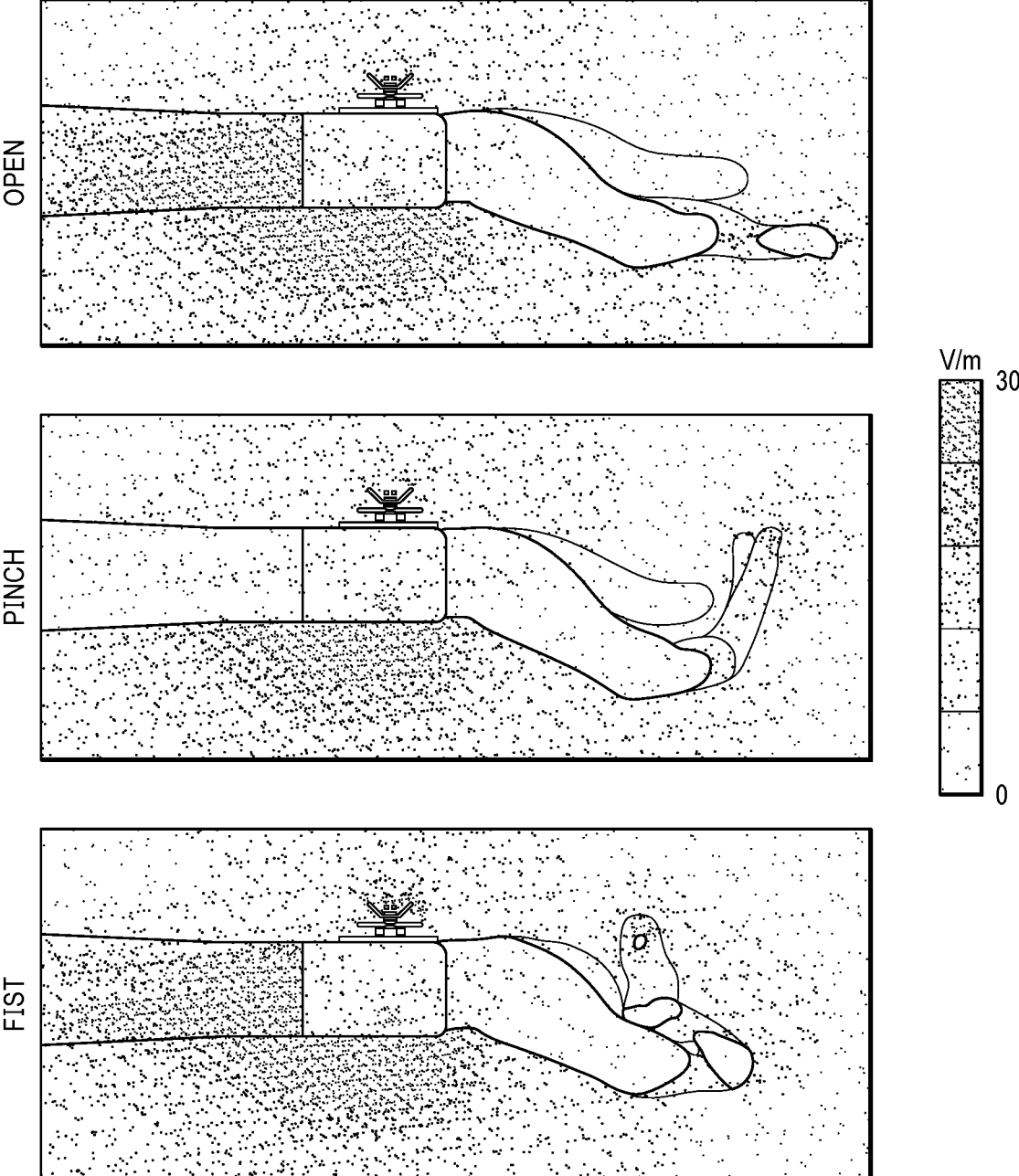

Among the five positions, the combination of front & right-back performed best (followed closely behind by front & back). In both cases, the three hand poses induced distinctive phase shifts, as well as move the peak frequency in magnitude. The machine learning accuracy was essentially unchanged using only a single front antenna. However, a two-antenna design was used for wrist-worn device 100 capture some hand configurations in an expanded pose set. FIGS. 7A and 7B show simulated electric field intensity distribution at resonance frequency, where one antenna is placed in the front-position and the secondary antenna is placed in the left-back position.

Figure 8A:
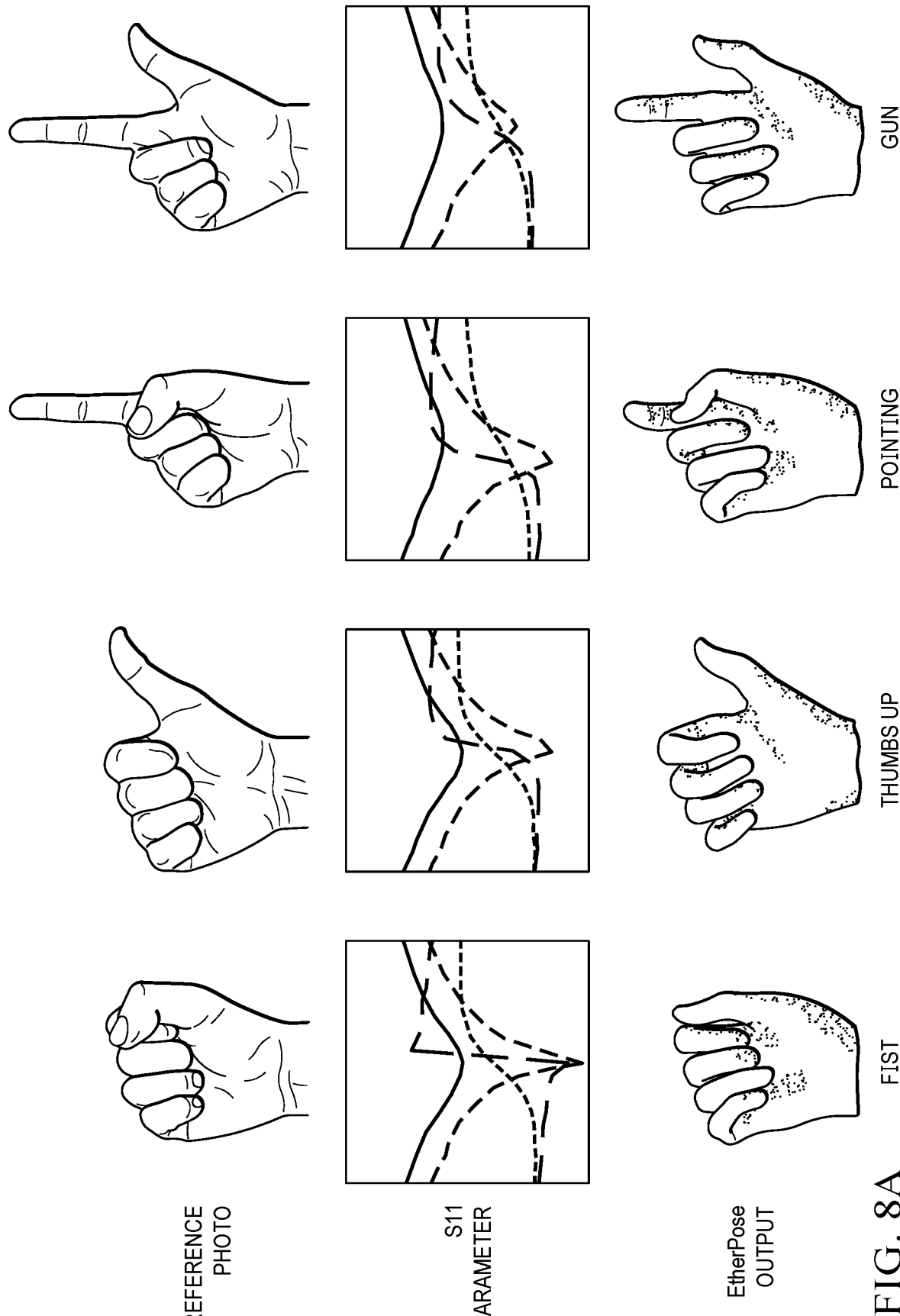
FIGS. 8A-8C show an S11 parameter sparkline and hand pose model output for eleven different hand poses, according to an embodiment.
Figure 8B:
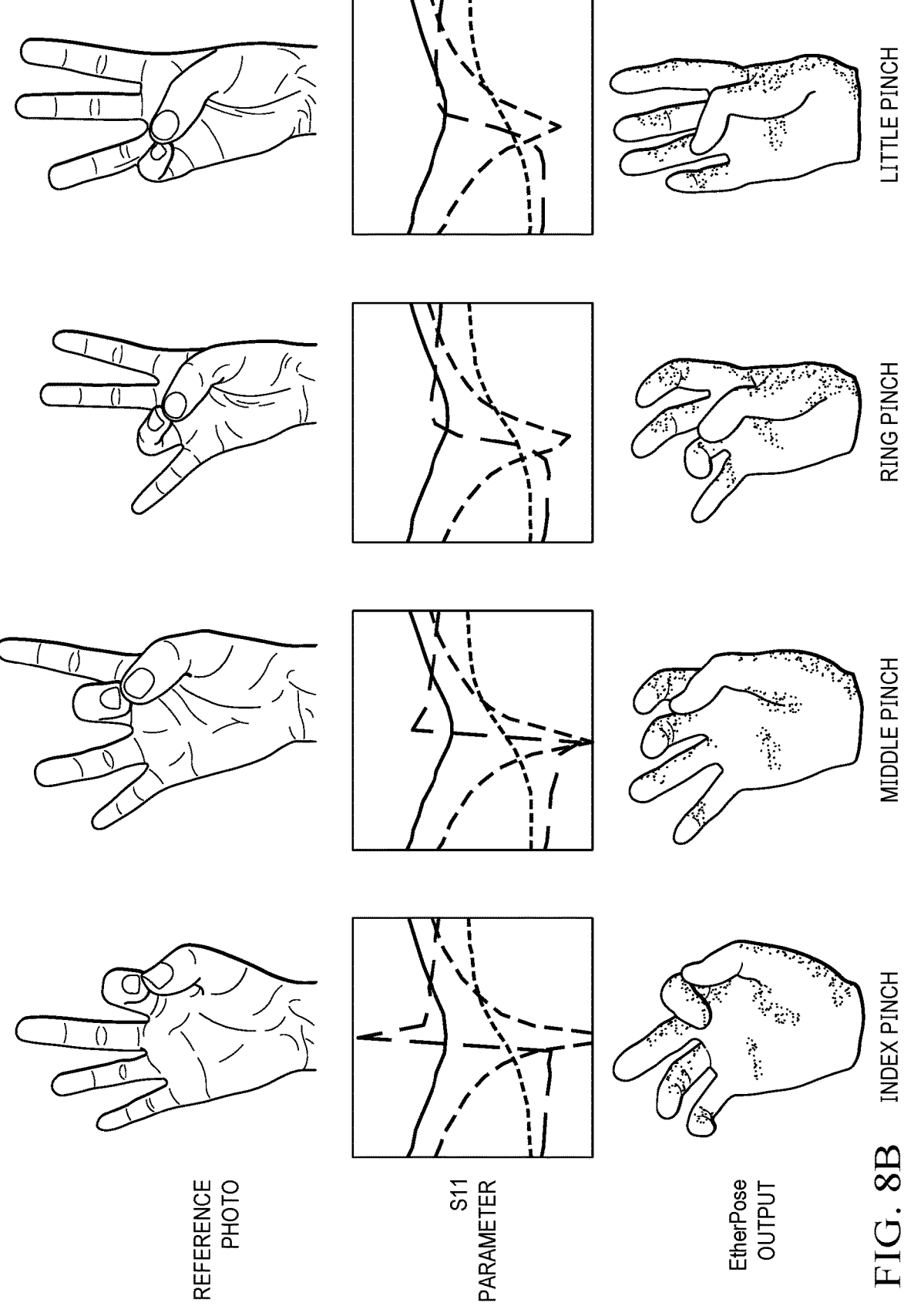
Figure 8C:
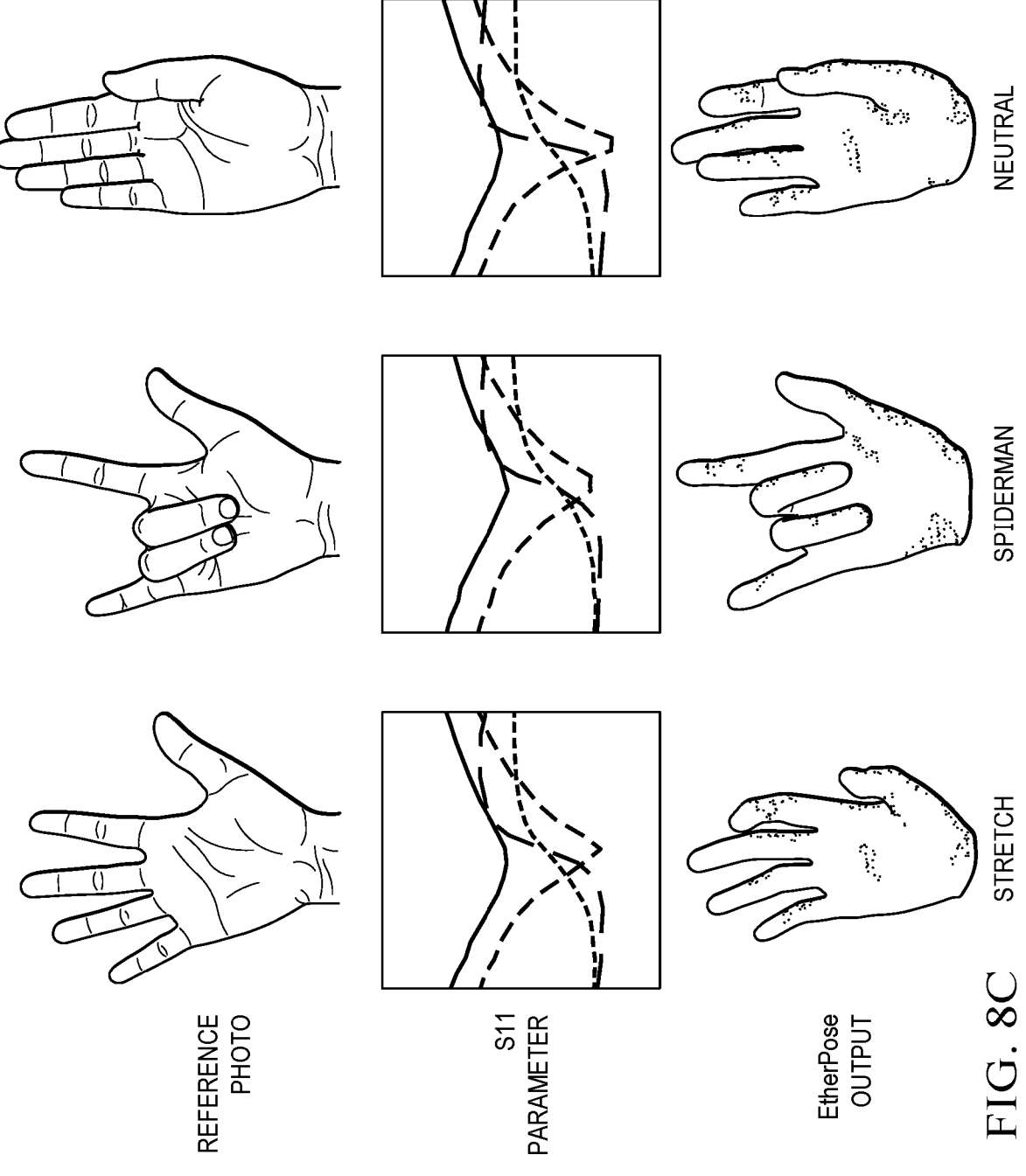

FIGS. 8A-8C illustrate eleven example hand poses that were used as hand pose "destination," with training data 109 collected continuously for all intermediate pose states. The middle row shows an example S11 parameter sparkline captured in the corresponding pose, and the bottom row shows example hand pose output from the processing pipeline shown in FIG. 1B.

Figure 9:
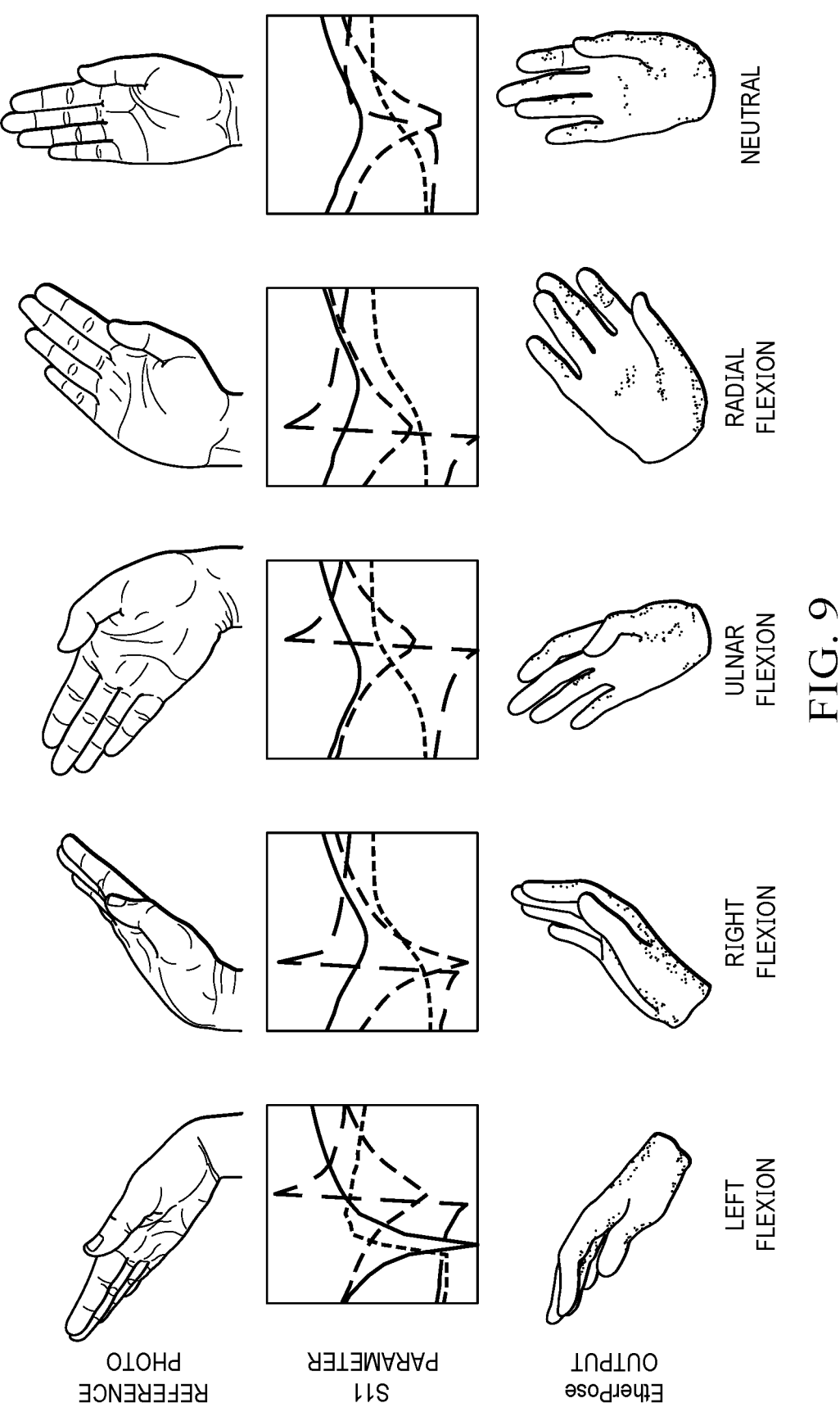
FIG. 9 shows an S11 parameter sparkline and hand pose model output for five wrist flexions, according to an embodiment.

FIG. 9 illustrates five example wrist flexions that were used as wrist angle "destinations," with training and testing data collected continuously for all intermediate pose states. The middle row shows an example S11 parameter sparkline captured in the corresponding pose, and the bottom row shows example hand pose output from the processing pipeline shown in FIG. 1B.

Example Process

Figure 10:
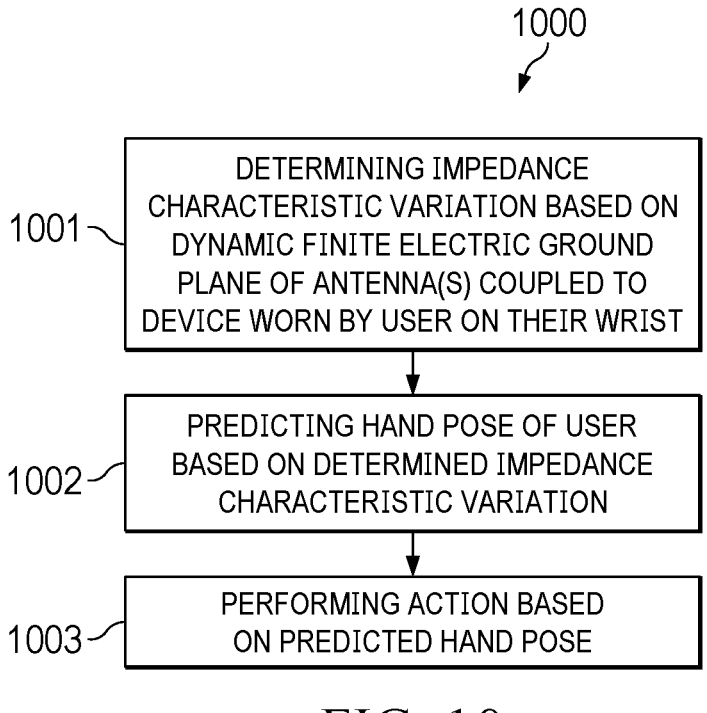
FIG. 10 is a flow diagram of a process of continuous hand pose tracking using wrist-worn antenna complex impedance characteristics sensing, according to an embodiment.

FIG. 10 is a flow diagram of a continuous hand pose tracking process (1000) using wrist-worn antenna impedance characteristics sensing, according to an embodiment. Process (1000) can be implanted by, for example, device 100 shown in FIG. 1.

Process (1000) includes: determining, with a wrist-worn device, an impedance characteristic variation based on a dynamic finite electric ground plane of at least one antenna coupled to the device (1001); predicting a hand pose of a user wearing the device on a their wrist based on the determined impedance characteristic variation (1002); and performing an action based on the predicted hand pose (1003). Each of these steps were previously described in reference to FIGS. 1-10.

ADDITIONAL EMBODIMENTS

The device can include one or more antennas mounted at any suitable location on the wrist. The antennas can include any suitable topology. Any suitable input modality and machine learning model can be used to predict hand poses. In an embodiment, the device can be implemented in an SoC, system in package (SIP) or a chipset. In an embodiment, the device can be integrated into a smartwatch or other wearable host device, and can utilize existing antennas and/or processors of the host device.

Because small changes in the worn location, or hand shape/size can have a significant impact on our antennas' complex impedance characteristic, in some embodiments per-worn-session calibration is employed. For example, when the user's arms are operating in front of the user, such as in a virtual reality (VR) experience, device 100 works well. However, when the arm gets too close to the user's body (or any conductive object, such as a steel door), the antennas may begin to couple causing their impedance characteristics to change. Less severe is metal jewelry, such as rings, as they are already part of the ground plane. Accordingly, in some embodiments more directional antennas can be employed on the device 100 that emit towards the hands, instead of radiating outwards. Additionally, different antenna topologies (including mixed topologies on one band) and greater number of antennas can be used, including more compact antennas than the cloverleaf design. In some embodiments, flexible printed circuit board (PCB) antennas can be used to enable truly thin form factors that could be integrated into the strap of, e.g., a smartwatch with an ASIC in the watch body interfacing with a totally passive band.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
   determining, with at least one processor of a wrist-worn device, a complex impedance characteristic variation based on a dynamic finite electric ground plane of at least one antenna coupled to the device; and
   predicting, with the at least one processor, a hand pose of a user wearing the device on their wrist based on the determined complex impedance characteristic variation.

2. The method of claim 1, wherein determining the complex impedance characteristic variation comprises:
   measuring return loss magnitude and phase shift for the at least one antenna as a function of frequency; and
   determining the complex impedance characteristic variation from the measured return loss magnitude and phase shift.

3. The method of claim 1, wherein the predicting is implemented using a machine learning model.

4. The method of claim 3, further comprising:
   measuring return loss magnitude and complex impedance magnitude and phase shift for the at least one antenna as a function of frequency, and determining the complex impedance characteristic variation from the measured return loss magnitude and complex impedance magnitude and phase shift;
   computing a first derivative of the return loss magnitude and complex impedance magnitude and phase shift;
   determining an index of a peak return loss magnitude;
   computing a mean of the return loss magnitudes and complex impedance magnitude and phase shifts;

computing a minimum and maximum of the return loss magnitudes and complex impedance magnitude and phase shifts;
   computing a standard deviation of the return loss magnitudes and complex impedance magnitude and phase shifts; and
   aggregating the first derivative, index of peak magnitude, minimum, maximum and standard deviation into an input feature vector; and
   providing the input feature vector to the machine learning model.

5. The method of claim 3, wherein a hand input modality for training the machine learning model include images of hand poses.

6. The method of claim 3, wherein a hand input modality for training the machine learning model include images of wrist angles.

7. The method of claim 3, wherein a hand input modality for training the machine learning model include images of discrete hand locations.

8. An apparatus comprising:
   at least one antenna;
   at least one processor coupled to the at least one antenna, the processor configured to perform operations comprising:
      determining a complex impedance characteristic variation based on a dynamic finite electric ground plane of at least one antenna coupled to a device; and
      predicting a hand pose of a user wearing the device on their wrist based on the determined complex impedance characteristic variation.

9. The apparatus of claim 8, wherein the apparatus includes at least two antennas with different topologies.

10. The apparatus of claim 8, wherein the apparatus includes at least two antennas with different resonant frequencies.

11. The apparatus of claim 8, wherein the apparatus includes at least two antennas with different polarization.

12. The apparatus of claim 8, wherein the apparatus includes at least two antennas with different antenna radiation patterns.

13. The apparatus of claim 8, wherein the apparatus includes at least two antennas with different quality factors.

14. The apparatus of claim 8, wherein the apparatus includes a distributed antenna array of two or more antennas.

15. The apparatus of claim 8, wherein the apparatus includes at least two antennas that are coupled to the device such that they radiate in opposite directions.

16. The apparatus of claim 8, wherein the at least one antenna is a cloverleaf antenna.

17. The apparatus of claim 8, wherein the apparatus is a smartwatch.

18. The apparatus of claim 8, further comprising an attachment mechanism for attaching the apparatus to a wrist.

19. A non-transitory, computer-readable storage medium storing instructions that when executed by at least one processor, cause the at least one processor to preform operations comprising:
   determining a complex impedance characteristic variation based on a dynamic finite electric ground plane of at least one antenna coupled to a wrist-worn device; and
   predicting a hand pose of a user wearing the device based on the determined complex impedance characteristic variation.

20. The non-transitory, computer-readable storage medium of claim 19, wherein determining the complex impedance characteristic variation comprises:

measuring return loss magnitude and complex impedance magnitude and phase shift for the at least one antenna as a function of frequency; and determining the complex impedance characteristic variation from the measured return loss magnitude and phase shift.

* * * * *

5